United States Patent

Sugio et al.

(10) Patent No.: US 10,082,057 B2
(45) Date of Patent: *Sep. 25, 2018

(54) OIL SEPARATOR

(71) Applicant: NABTESCO AUTOMOTIVE CORPORATION, Tokyo (JP)

(72) Inventors: Takuya Sugio, Tokyo (JP); Ichiro Minato, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 14/380,847

(22) PCT Filed: Feb. 27, 2013

(86) PCT No.: PCT/JP2013/055187
§ 371 (c)(1),
(2) Date: Aug. 25, 2014

(87) PCT Pub. No.: WO2013/129495
PCT Pub. Date: Sep. 6, 2013

(65) Prior Publication Data
US 2015/0040767 A1 Feb. 12, 2015

(30) Foreign Application Priority Data

| Feb. 27, 2012 | (JP) | 2012-040580 |
| May 8, 2012 | (JP) | 2012-106869 |
| Jul. 2, 2012 | (JP) | 2012-148646 |

(51) Int. Cl.
B01D 59/26 (2006.01)
F01M 11/08 (2006.01)
(Continued)

(52) U.S. Cl.
CPC ............. F01M 11/08 (2013.01); B01D 45/02 (2013.01); B01D 45/04 (2013.01); B01D 45/08 (2013.01);
(Continued)

(58) Field of Classification Search
CPC ......... F01N 3/037; F04B 39/04; B01D 45/08; B01D 46/0031; B01D 45/02; B01D 45/04;
(Continued)

(56) References Cited

U.S. PATENT DOCUMENTS 1,621,026 A * 3/1927 Pukerud ................. H01H 33/57
220/747
2,082,863 A * 6/1937 Weisgerber ........ B01D 19/0057
96/216

(Continued)

FOREIGN PATENT DOCUMENTS

| CN | 1248480 A | 3/2000 |
| CN | 1625649 A | 6/2005 |

(Continued)

OTHER PUBLICATIONS

First Office Action issued by the State Intellectual Property Office of the People's Republic of China and English translation thereof, dated Nov. 3, 2015 in connection with Chinese Application No. 201380010722.9, 12 pages.

(Continued)

*Primary Examiner* — Dung H Bui
(74) *Attorney, Agent, or Firm* — Wolf, Greenfield & Sacks, P.C.

(57) ABSTRACT

An oil separator is provided with a case that has an air inlet and a plurality of expansion chambers formed within the case. Air that contains oil is introduced into the case via the inlet and caused to strike a impingement plate to thereby (Continued)

separate the oil from the introduced air and recover the oil. The transverse cross-sectional area of each expansion chamber is greater than the open area of the inlet. Partition walls with orifice holes formed therein are provided between the expansion chambers.

9 Claims, 12 Drawing Sheets

(51) Int. Cl.
    *B01D 45/02*     (2006.01)
    *B01D 45/04*     (2006.01)
    *B01D 45/08*     (2006.01)
    *F04B 39/16*     (2006.01)
    *F01M 13/04*     (2006.01)
    *F01N 3/037*     (2006.01)
    *B01D 46/00*     (2006.01)
    *F01M 13/00*     (2006.01)

(52) U.S. Cl.
CPC ............. *F01M 13/04* (2013.01); *F04B 39/16* (2013.01); *B01D 46/0031* (2013.01); *F01M 2013/0072* (2013.01); *F01M 2013/045* (2013.01); *F01M 2013/0433* (2013.01); *F01M 2013/0438* (2013.01); *F01M 2013/0461* (2013.01); *F01M 2013/0477* (2013.01); *F01N 3/037* (2013.01)

(58) Field of Classification Search
CPC ........... F01M 11/08; F01M 2013/0433; F01M 2013/0438; F01M 2013/045; F01M 2013/0461; F01M 2013/0477; F01M 2013/0072
See application file for complete search history.

(56) References Cited

U.S. PATENT DOCUMENTS

| | | | |
|---|---|---|---|
| 2,756,837 A * | 7/1956 | Lovelady | B01D 19/0057 60/39.826 |
| 2,776,054 A * | 1/1957 | Hirshstein | B01D 17/0211 210/257.1 |
| 2,942,691 A | 6/1960 | Dillon | |
| 2,966,233 A * | 12/1960 | Nelson | F01N 1/165 137/468 |
| 3,000,467 A * | 9/1961 | Bowers | F02M 37/0047 210/436 |
| 3,075,336 A | 1/1963 | Hays | |
| 3,201,924 A | 8/1965 | Fulford et al. | |
| 3,432,991 A * | 3/1969 | Sauder | C10G 33/02 204/563 |
| 4,136,009 A | 1/1979 | Samiran | |
| 4,167,164 A | 9/1979 | Bachmann | |
| 4,226,726 A * | 10/1980 | Rehm | B04C 5/13 209/728 |
| 4,298,465 A * | 11/1981 | Druffel | B01D 17/0211 210/304 |
| 4,534,861 A | 8/1985 | Wedemeyer et al. | |
| 4,541,933 A * | 9/1985 | Arnold | B01D 21/0012 210/780 |
| 4,627,406 A | 12/1986 | Namiki et al. | |
| 4,668,256 A | 5/1987 | Billiet et al. | |
| 4,878,923 A | 11/1989 | Muller | |
| 4,892,569 A | 1/1990 | Kojima | |
| 4,982,569 A | 1/1991 | Bronicki | |
| 5,024,203 A | 6/1991 | Hill | |
| 5,145,497 A | 9/1992 | Maeda | |
| 5,171,130 A | 12/1992 | Kume et al. | |
| 5,595,588 A | 1/1997 | Blevins | |
| 6,000,383 A | 12/1999 | Diotte et al. | |
| 6,058,917 A * | 5/2000 | Knowles | F01M 13/04 123/573 |
| 6,302,933 B1 | 10/2001 | Krause et al. | |
| 6,626,163 B1 | 9/2003 | Busen et al. | |
| 7,857,882 B1 | 12/2010 | Johnson | |
| 8,540,809 B2 | 9/2013 | Minato et al. | |
| 9,017,460 B2 | 4/2015 | Minato et al. | |
| 9,533,246 B2 | 1/2017 | Sugio et al. | |
| 2002/0129586 A1 | 9/2002 | Tanaka | |
| 2003/0074870 A1 | 4/2003 | Virgilio | |
| 2003/0110949 A1 | 6/2003 | Fornof et al. | |
| 2003/0172632 A1 * | 9/2003 | Matsubara | B01D 45/16 55/417 |
| 2004/0040273 A1 * | 3/2004 | Lewin | B01D 45/12 55/447 |
| 2004/0238452 A1 * | 12/2004 | Moore | C02F 5/02 210/702 |
| 2005/0092180 A1 | 5/2005 | Fornof et al. | |
| 2005/0188848 A1 | 9/2005 | Salzman et al. | |
| 2006/0130654 A1 | 6/2006 | King et al. | |
| 2006/0248921 A1 | 11/2006 | Hosford et al. | |
| 2006/0254566 A1 | 11/2006 | Yasuhara | |
| 2007/0175186 A1 | 8/2007 | Braziunas | |
| 2007/0181472 A1 * | 8/2007 | Dawes | B01D 17/0208 210/121 |
| 2007/0215128 A1 | 9/2007 | Yonebayashi et al. | |
| 2008/0011550 A1 | 1/2008 | Dunn et al. | |
| 2008/0105125 A1 | 5/2008 | Lauson et al. | |
| 2009/0056292 A1 | 3/2009 | Fornof et al. | |
| 2009/0071188 A1 | 3/2009 | Kusada et al. | |
| 2009/0193770 A1 | 8/2009 | Holzmann et al. | |
| 2009/0250044 A1 | 10/2009 | Braun et al. | |
| 2010/0006075 A1 | 1/2010 | Ruppel et al. | |
| 2010/0178236 A1 | 7/2010 | Rameshni et al. | |
| 2010/0218682 A1 | 9/2010 | Hammerschick | |
| 2010/0229510 A1 | 9/2010 | Heinen et al. | |
| 2011/0088641 A1 | 4/2011 | Shudo et al. | |
| 2011/0113738 A1 | 5/2011 | Zachos | |
| 2011/0179755 A1 | 7/2011 | Gruhler et al. | |
| 2011/0308393 A1 | 12/2011 | Minato et al. | |
| 2012/0060452 A1 | 3/2012 | Sikkenga et al. | |
| 2012/0174537 A1 * | 7/2012 | Tornblom | B01D 45/14 55/406 |
| 2012/0180442 A1 | 7/2012 | Siber et al. | |
| 2012/0186451 A1 | 7/2012 | Duesel, Jr. et al. | |
| 2013/0167719 A1 * | 7/2013 | Alper | B63J 4/002 95/25 |
| 2014/0345461 A1 | 11/2014 | Sikkenga et al. | |
| 2016/0008741 A1 * | 1/2016 | Beg | B01D 45/02 96/182 |

FOREIGN PATENT DOCUMENTS

| | | |
|---|---|---|
| CN | 1874920 A | 12/2006 |
| CN | 201221882 Y | 4/2009 |
| CN | 102317585 A | 1/2012 |
| DE | 742669 C | 12/1943 |
| DE | 10 2004 016742 B3 | 9/2005 |
| DE | 10 2006 008516 A1 | 8/2007 |
| DE | 102011002582 A1 | 9/2011 |
| EP | 0 846 485 A1 | 11/1997 |
| GB | 2033247 A | 5/1980 |
| JP | S47-029633 B | 8/1972 |
| JP | S52 13336 U | 1/1977 |
| JP | S52-65381 U | 5/1977 |
| JP | S52-155279 U | 11/1977 |
| JP | S53-122007 A | 10/1978 |
| JP | S55-126919 U | 9/1980 |
| JP | S56-163918 U | 12/1981 |
| JP | S57 181913 A | 11/1982 |
| JP | 58-64812 U | 5/1983 |
| JP | S59109284 A | 6/1984 |
| JP | 60-80615 A | 5/1985 |
| JP | 60-84714 U | 6/1985 |
| JP | S62-071322 U | 5/1987 |
| JP | S62-99313 | 6/1987 |
| JP | S62-179014 U | 11/1987 |
| JP | 1-84725 U | 6/1989 |

(56) References Cited

FOREIGN PATENT DOCUMENTS

| | | |
|---|---|---|
| JP | 1-114025 U | 8/1989 |
| JP | H01-242119 A | 9/1989 |
| JP | 1-156729 U | 10/1989 |
| JP | 2-48125 U | 4/1990 |
| JP | 2-133419 U | 11/1990 |
| JP | H2-147212 | 12/1990 |
| JP | 3-30813 A | 2/1991 |
| JP | H03-59416 U | 6/1991 |
| JP | H03-164584 A | 7/1991 |
| JP | 3-246149 A | 11/1991 |
| JP | H03-115028 U | 11/1991 |
| JP | H04-27780 A | 1/1992 |
| JP | 4-59321 U | 5/1992 |
| JP | H04-053174 U | 5/1992 |
| JP | 4-70970 U | 6/1992 |
| JP | 4-78481 U | 7/1992 |
| JP | H04-110118 U | 9/1992 |
| JP | H05-037628 U | 5/1993 |
| JP | H05-83382 U | 11/1993 |
| JP | H05-296173 A | 11/1993 |
| JP | 63-157234 U | 5/1994 |
| JP | 2-106526 U | 11/1994 |
| JP | 6-330720 A | 11/1994 |
| JP | H06-346855 A | 12/1994 |
| JP | 7-4880 U | 1/1995 |
| JP | H07-197886 A | 1/1995 |
| JP | 07-013418 U | 3/1995 |
| JP | H07-8020 U | 3/1995 |
| JP | H07-227514 A | 8/1995 |
| JP | 7-243318 A | 9/1995 |
| JP | 7-269326 A | 10/1995 |
| JP | H7-332810 A | 12/1995 |
| JP | H08-173740 A | 7/1996 |
| JP | H08-233415 A | 9/1996 |
| JP | 8-290027 A | 11/1996 |
| JP | 9-177532 A | 7/1997 |
| JP | H10-176667 A | 6/1998 |
| JP | H10-211407 A | 8/1998 |
| JP | H10-323529 A | 12/1998 |
| JP | H11-108474 A | 4/1999 |
| JP | H11-510757 A | 9/1999 |
| JP | 2000045749 A | 2/2000 |
| JP | 2000-282839 A | 10/2000 |
| JP | 2002-97919 A | 4/2002 |
| JP | 2002-544421 A | 12/2002 |
| JP | 2003-531330 A | 10/2003 |
| JP | 2003-322084 A | 11/2003 |
| JP | 2004-232625 | 8/2004 |
| JP | 2005-066470 A | 3/2005 |
| JP | 2006-075688 A | 3/2006 |
| JP | 2006-75814 A | 3/2006 |
| JP | 2006-316641 A | 11/2006 |
| JP | 2007-016664 A | 1/2007 |
| JP | 2007-162248 A | 6/2007 |
| JP | 2007-247623 A | 9/2007 |
| JP | 2007-255397 A | 10/2007 |
| JP | 2008-2377 A | 1/2008 |
| JP | 2008-19857 A | 1/2008 |
| JP | 2008-202894 A | 9/2008 |
| JP | 2009-008096 A | 1/2009 |
| JP | 2009-109102 A | 2/2009 |
| JP | 2010-017823 | 1/2010 |
| JP | 2010-501788 A | 1/2010 |
| JP | 2010-270743 A | 12/2010 |
| JP | 2011-025205 A | 2/2011 |
| JP | 2011-027331 A | 2/2011 |
| JP | 2011-085118 A | 4/2011 |
| JP | 2011-157927 A | 8/2011 |
| JP | 10-296038 A | 11/2014 |
| WO | WO 88/02658 A1 | 4/1988 |
| WO | WO 00/68548 | 11/2000 |
| WO | WO 01/52973 A1 | 7/2001 |
| WO | WO 01/79664 A1 | 10/2001 |
| WO | WO 2007/036560 A1 | 4/2007 |

OTHER PUBLICATIONS

English Translation of Japanese Notice of Reasons for Refusal dated Nov. 24, 2015 in connection with Japanese Patent Appln. No. 2012-040584, 6 pages.

Translation of the Written Opinion of the ISA for related patent application PCT/JP2013/055187, dated Sep. 2, 2014, pp. 1-9.

Supplemental European Search Report dated Dec. 22, 2015 in connection with European Application No. EP 13755024, 7 pages.

English Translation of Japanese Notice of Reasons for Refusal dated Dec. 1, 2015 in connection with Japanese Patent Appln. No. 2012-040583, 4 pages.

European Search Report in corresponding application No. EP 13755157.8, dated Dec. 15, 2015, pp. 1-8.

Partial Supplementary European Search Report dated Jan. 26, 2016 in connection with European Application No. EP 13754685, 7 pages.

English Translation of Japanese Notice of Reasons for Refusal dated Jan. 27, 2016 in connection with Japanese Patent Appln. No. 2012-147748, 6 pages.

Non-Final Office Action issued by the U.S. Patent and Trademark Office dated Apr. 22, 2016 in connection with U.S. Appl. No. 14/410,992, 17 pgs.

English Translation of Japanese Notification of Reasons for Refusal dated Apr. 26, 2016 in connection with Japanese Patent Appln. No. 2012-106869, 9 pages.

Non-Final Office Action issued by the U.S. Patent and Trademark Office dated May 25, 2016 in connection with U.S. Appl. No. 14/380,810.

Extended European Search Report dated Jun. 24, 2016 in connection with European Application No. EP 13754685, 9 pages.

English Translation of Japanese Notification of Reasons for Refusal dated Aug. 25, 2015 in connection with Japanese Patent Appln. No. JP2012-040580, 4 pages.

Non-Final Office Action issued by the U.S. Patent and Trademark Office dated Dec. 24, 2015, in connection with U.S. Appl. No. 14/380,830, 9 pgs.

Japanese Office Action for Application No. 2012-147748 dated Sep. 27, 2016.

Japanese Office Action for Application No. 2012-241234 dated Oct. 6, 2016.

Japanese Office Action for Application No. 2013-036394 dated Oct. 3, 2016.

Extended European Search Report dated Jul. 5, 2016 in connection with European Application No. EP 13813863, 6 pages.

Non-Final Office Action issued by the U.S. Patent and Trademark Office dated Aug. 1, 2016 in connection with U.S. Appl. No. 14/399,485, 28 pages.

Extended European Search Report dated Aug. 16, 2016 in connection with European Application No. EP 13788303, 10 pages.

Office Action for Japanese Application No. 2016-138862, dated Apr. 25, 2017, 5 pages.

Non-Final Office Action for U.S. Appl. No. 14/399,485, dated Jun. 6, 2017, 12 pages.

Office Action for U.S. Appl. No. 14/399,485, dated Jan. 4, 2017.

Office Action for Japanese Application No. 2017-026067, dated Oct. 31, 2017.

Office Action for Japanese Application No. 2016-138863, dated Jun. 27, 2017.

Office Action for Chinese Application No. 201610031843.7, dated May 27, 2017.

Office Action for Japanese Application No. 2013-098863, dated Jun. 5, 2017.

Office Action for Japanese Application No. 2013-098864, dated Jun. 16, 2017.

Office Action for U.S. Appl. No. 15/360,406, dated Apr. 3, 2018.

Office Action for Japanese Application No. 2017-026067 dated Jun. 5, 2018.

* cited by examiner

OIL SEPARATOR

FIELD OF THE INVENTION

The present invention relates to an oil separator that separates oil contained in air that has passed through equipment.

BACKGROUND OF THE INVENTION

Vehicles such as trucks, buses, and construction machines utilize compressed air sent from a compressor, which is directly connected to an engine, to control systems such as brakes and suspensions. The compressed air contains water, which is contained in the atmosphere, and oil for lubricating the interior of the compressor. When the compressed air containing water and oil enters inside the systems, it causes rust and swelling of rubber members (such as O-rings) and results in an operational defect. Thus, an air dryer is provided downstream of the compressor in an air system for removing water and oil from the compressed air (for example, Patent Document 1).

A filter and a desiccant such as silica gel and zeolite are provided in the air dryer. The air dryer performs dehumidification to remove water from compressed air and regeneration to regenerate the desiccant by removing the water absorbed by the desiccant and discharging it to the outside.

The air discharged from the air dryer during regeneration of the desiccant contains oil together with water. Considering the burden on the environment, an oil separator may be provided downstream of the compressor in the air system.

An impingement plate-type oil separator performs gas/liquid separation by allowing air that contains water and oil to strike impingement plates provided in the housing to recover the oil from the air and discharge cleaned air (for example, Patent Document 2).

PRIOR ART DOCUMENTS

Patent Document

Patent Document 1: Japanese Laid-Open Patent Publication No. 10-296038
Patent Document 2: Japanese Laid-Open Patent Publication No. 2008-2377

SUMMARY OF THE INVENTION

The inside of the housing of the above-mentioned oil separator is divided into a primary chamber and a secondary chamber by a partition wall. In the above-mentioned oil separator, only a small amount of oil is separated in the primary chamber so that air containing oil flows into the secondary chamber, and a large amount of oil is separated in the secondary chamber. Thus, in the above-mentioned oil separator, more oil is stored in the secondary chamber than in the primary chamber. There has been a demand for oil separators that can separate a large amount of oil in the apparatus as a whole.

It is an objective of the present invention to provide an oil separator that can separate a large amount of oil in the apparatus as a whole.

To achieve the foregoing objective and in accordance with one aspect of the present invention, an oil separator is provided that includes a housing including an inlet for air and an outlet for air and a plurality of expansion chambers in the housing. The oil separator introduces air containing oil into the housing through the inlet and causes the air to strike an impingement plate to separate oil from the introduced air, thereby recovering the oil. The transverse cross-sectional area of each expansion chamber is greater than the opening area of the inlet. A partition wall in which an orifice hole is formed is provided between the expansion chambers.

In accordance with another aspect of the present invention, an oil separator is provided that includes a housing including an inlet for air and an outlet for air and an impingement member located in the housing. The oil separator introduces air containing oil into the housing through the inlet and causes the air to strike the impingement member to separate oil from the introduced air, thereby recovering the oil. The housing further includes an introduction portion. The inlet is formed in the introduction portion to be open in the horizontal direction of the housing. The flow path cross-sectional area of the introduction portion is smaller than the flow path cross-sectional area of the housing. The introduction portion has a restricting member, which restricts the separated oil from flowing back to the inlet.

In accordance with a further aspect of the present invention, an oil separator is provided that includes a housing including an inlet for air and an outlet for air, an expansion chamber, which is located in the housing and expands air that has been introduced through the inlet, an accommodation member, and a collected liquid storage portion. The accommodation member is located in the housing and communicates with the expansion chamber in the vertical direction. The accommodation member accommodates an impingement member. The collected liquid storage portion is located below the accommodation member. The oil separator introduces air containing oil into the housing through the inlet, and causes the air to strike the impingement member to separate oil from the introduced air, thereby recovering the oil. The inlet and the outlet are located in an upper section of the housing.

DETAILED DESCRIPTION OF THE PREFERRED EMBODIMENTS

An oil separator according to a first embodiment will now be described with reference to FIGS. 1 to 7. The oil separator is applied to an exhaust system of an air dryer.

Figure 1:
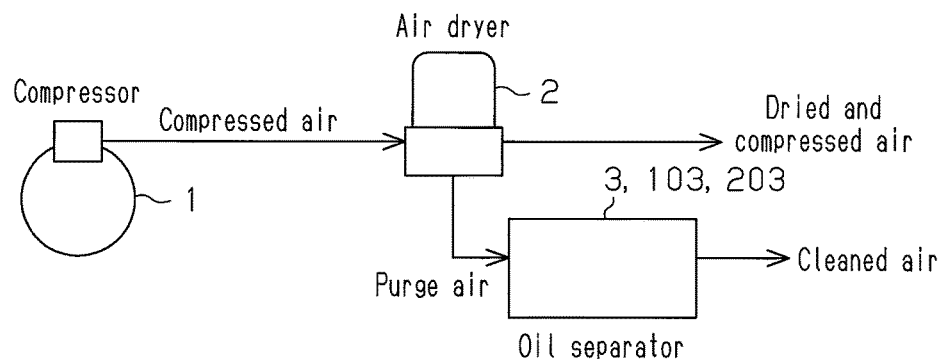
FIG. 1 is a block diagram illustrating an installation position of an oil separator according to a first embodiment of the present invention in an air system.

As shown in FIG. 1, vehicles such as trucks, buses, and construction machines utilize compressed air sent from a compressor 1 to control systems such as brakes and suspensions. Thus, an air dryer 2, which removes oil and water in the compressed air and provides dried air, is located downstream of the compressor 1 of an air system. A desiccant is provided in the air dryer 2. The air dryer 2 performs dehumidification to remove oil and water from the compressed air, and regeneration to regenerate the desiccant by removing the oil and the water absorbed by the desiccant and discharging them to the outside.

In the present embodiment, since air (purge air) discharged from the air dryer 2 during regeneration of the desiccant includes oil together with water, an oil separator 3 is provided downstream of the compressor 1 of the air system considering the burden on the environment. In particular, the oil separator 3 is provided in an exhaust system of the air dryer 2, and separates and recovers the oil and the water from purge air discharged during regeneration of the desiccant in the air dryer 2.

The oil separator 3 is an impingement plate-type oil separator and includes, inside the housing, impingement plates, against which air containing oil and water strikes. The impingement plate-type oil separator 3 performs gas/liquid separation by allowing the air containing oil and water to strike the impingement plates. In this manner, the oil separator 3 recovers oil from air, and discharges cleaned air.

Figure 2:
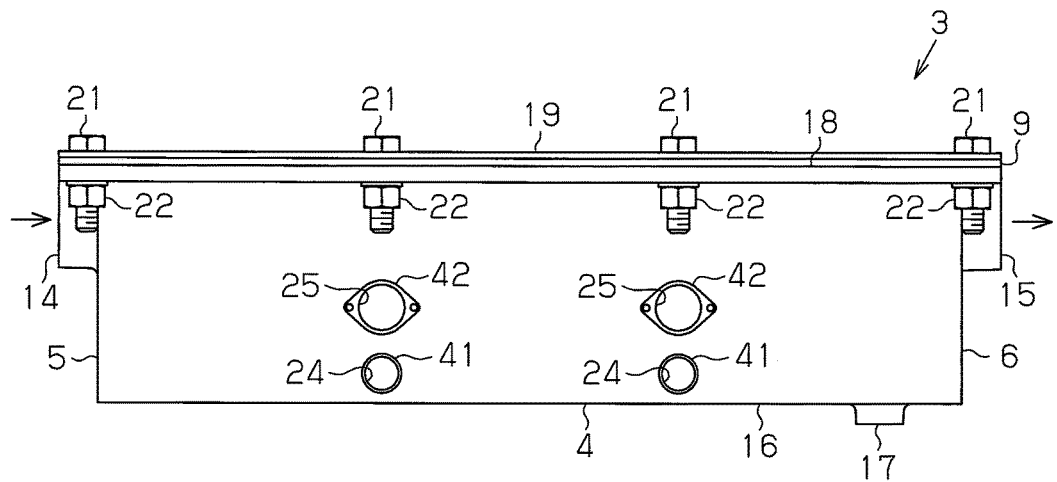
FIG. 2 is a side view illustrating the external structure of the oil separator of FIG. 1.

As shown in FIG. 2, the oil separator 3 includes a rectangular parallelepiped housing 4, which extends in the horizontal direction. An inlet 14 and an outlet 15 are respectively formed in a front side 5 and a rear side 6 of the housing 4. The front side 5 and the rear side 6 are opposed to each other in the longitudinal direction. That is, air passes through the oil separator 3 from left to right in FIG. 2. Furthermore, a drain outlet 17, which discharges the collected liquid, is formed at part of a bottom face 16 close to the rear side 6. The collected liquid contains oil and water separated from the air.

Furthermore, an opening portion 18 is formed in the upper surface of the housing 4. The opening portion 18 is closed by a rectangular lid 19. A sealing sheet 20, which covers the entire opening portion 18, is sandwiched between the opening portion 18 and the lid 19. The lid 19, the sealing sheet 20, and the housing 4 are tightly secured by bolts 21 and nuts 22. The lid 19 restricts movement of members accommodated in the housing 4.

Figure 3:
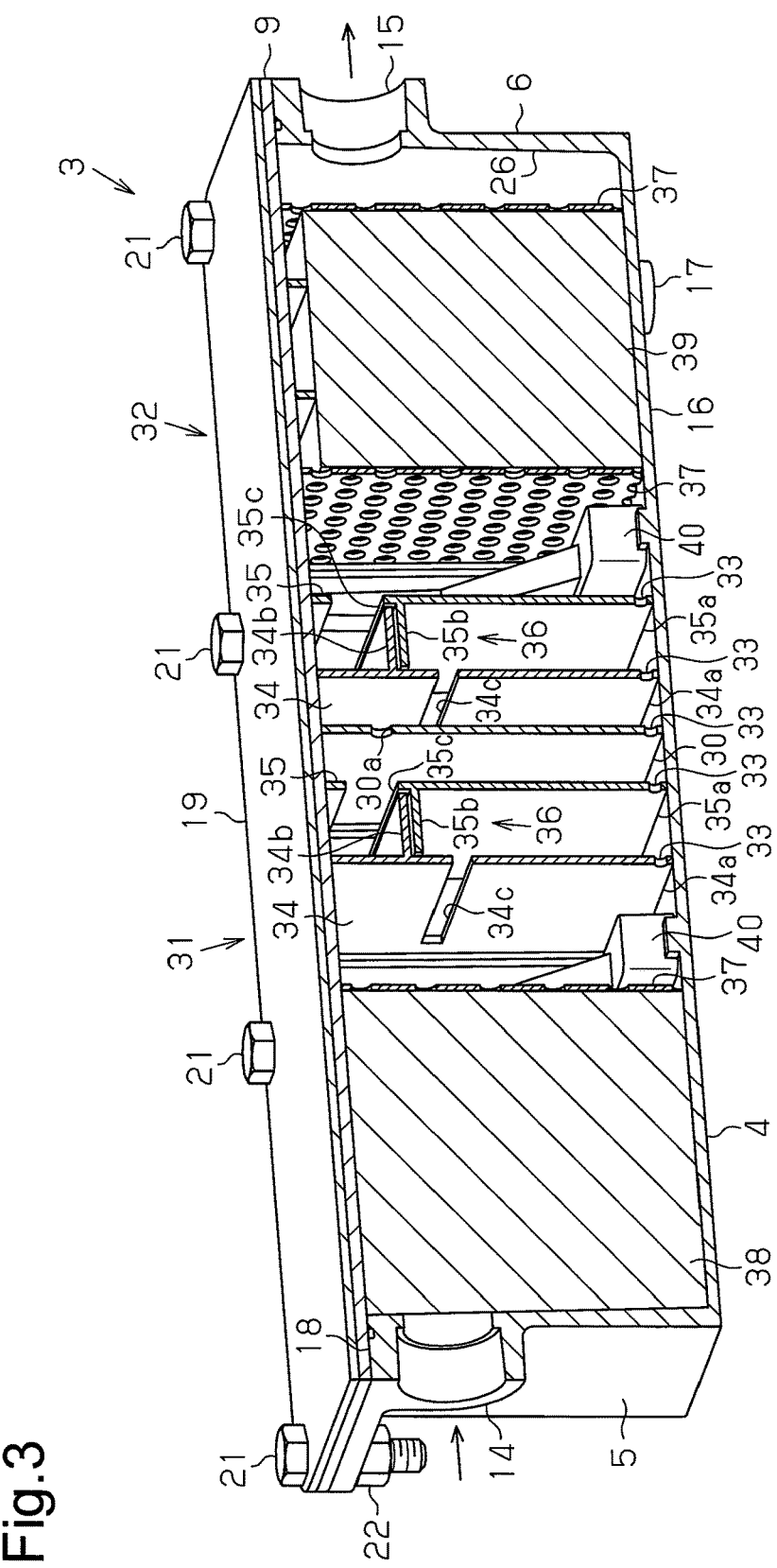
FIG. 3 is a vertical cross-sectional perspective view illustrating the internal structure of the oil separator of FIG. 2.

As shown in FIG. 3, a plate-like partition wall 30 is provided at a longitudinal center portion in the housing 4. The inside of the housing 4 is divided by the partition wall 30 into a primary expansion chamber 31 close to the inlet 14 and a secondary expansion chamber 32 close to the outlet 15 in the horizontal direction. The transverse cross-sectional areas of the primary expansion chamber 31 and the secondary expansion chamber 32 are each greater than the transverse cross-sectional area of the inlet 14. The transverse cross-sectional area here corresponds to an area of a cross-section perpendicular to the longitudinal direction of the housing 4. Thus, since the air introduced into the expansion chambers expands, the flow velocity in the expansion chambers is reduced. Since the flow velocity of the air is reduced, the saturated vapor pressure is further reduced. This causes oil and water to easily condense, increasing the mass of particles of oil and water and allowing them to easily strike the impingement plates.

A through hole (orifice hole) 30a is formed at the upper section of the partition wall 30. Thus, the partition wall 30 functions as an orifice, which controls the flow of air from the primary expansion chamber 31 to the secondary expansion chamber 32 by the orifice hole 30a. Also, a communication hole 33 is formed at the lower section of the partition wall 30 in the vicinity of the bottom face 16. The communication hole 33 permits the collected liquid separated from the air and recovered to pass between the expansion chambers 31, 32.

Furthermore, impingement plates 34, 35, which are opposed to each other, are provided on both sides of the partition wall 30 in the housing 4. The first impingement plate 34 located toward the upstream end includes a first upright plate 34a, which extends from the bottom face 16 of the housing 4 to the lid 19, and a first baffle plate 34b, which extends perpendicularly from the first upright plate 34a in the longitudinal direction of the housing 4 toward the outlet 15. The first upright plate 34a includes a rectangular first through hole 34c, which extends in the widthwise direction of the impingement plates 34, 35, at a position lower than the joint to the first baffle plate 34b.

The second impingement plate 35 located toward the downstream end includes a second upright plate 35a, which extends from the bottom face 16 of the housing 4 to the lid 19, and a second baffle plate 35b, which extends perpendicularly from the second upright plate 35a in the longitudinal direction of the housing 4 toward the inlet 14. The second upright plate 35a includes a rectangular second through hole 35c, which extends in the widthwise direction of the impingement plates 34, 35 at a position upper than the joint to the second baffle plate 35b.

The first baffle plate 34b and the second baffle plate 35b project to obstruct the flow of air, and form an extremely narrow section 36. The extremely narrow section 36 is a narrow gap formed by arranging the wide surfaces of the first baffle plate 34b and the second baffle plate 35b close to each other. The first baffle plate 34b is located closer to the lid 19 than the second baffle plate 35b. The extremely narrow section 36 increases the flow velocity of the air and creates a meandering path, which further increases chances for oil and water particles to strike the plates. This causes the oil and the water to be further reliably separated from the air. Furthermore, since the baffle plates 34b, 35b are provided, the oil and the water that have dropped while passing between the first impingement plate 34 and the second impingement plate 35 are prevented from being lifted or stirred up by the air that passes between the first impingement plate 34 and the second impingement plate 35 and from being carried downstream through the second through hole 35c. Thus, the quantity of the collected liquid is prevented from being reduced. Communication holes 33 are each formed at the lower sections of the first impingement plate 34 or the second impingement plate 35 in the vicinity of the bottom face 16. The communication holes 33 allow the liquid that has been separated from the air and recovered to pass through the communication holes 33.

In the internal space of the primary expansion chamber 31, the pair of impingement plates 34, 35 is provided. A urethane foam 38 such as a sponge is located between the inlet 14 and the pair of impingement plates 34, 35. A punched metal plate 37 in which bores are formed is mounted on the side of the urethane foam 38 facing the impingement plate 34. The urethane foam 38 traps the oil and the water contained in the air.

The pair of impingement plates 34, 35 is also provided in the internal space of the secondary expansion chamber 32. A crushed aluminum member 39 is located between the pair of impingement plates 34, 35 and the outlet 15. Punched metal plates 37 in which bores are formed are respectively mounted on the surfaces of the crushed aluminum member 39 facing the impingement plates 34, 35. That is, the crushed aluminum member 39 is sandwiched between the pair of punched metal plates 37. The crushed aluminum member 39 traps the oil and the water contained in the air.

Figure 4:
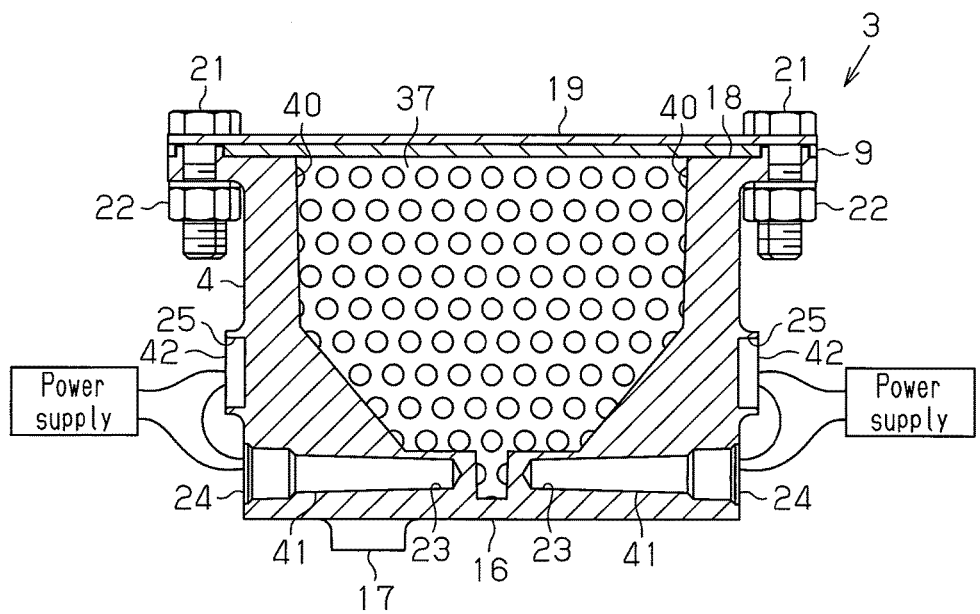
FIG. 4 is a transverse cross-sectional view illustrating a heating section of the oil separator of FIG. 3.

As shown in FIG. 4, ribs 40, which increase the strength of the housing 4, are each provided in the expansion chambers 31, 32. Columnar accommodation portions 23 for accommodating heating means, which are heaters 41 in this embodiment, are formed in each rib 40 at positions close to the bottom face 16. Insertion openings 24 for inserting the heaters 41 are formed in the outer surface of the housing 4. The insertion openings 24 are each connected to the associated accommodation portion 23. The heaters 41 are columnar and are each inserted in the associated accommodation portion 23 from the outer surface of the housing 4. The heater 41 is connected to a power supply.

Also, a mounting hole 25 for mounting a thermostat 42 is formed in the outer surface of the housing 4 above each insertion opening 24. The thermostat 42 is mounted on the mounting hole 25, and is connected to the power supply and the heater 41. Each thermostat 42 detects the temperature of the housing 4, and controls heating of the associated heater 41 based on the detected temperature. The water contained in the collected liquid that is stored at the bottom face of the housing 11 is evaporated as much as possible by heating the housing 11 with the heaters 41 so that liquid containing high concentration of oil is generated. Furthermore, by heating the housing 4 with the heaters 41, the oil separator 3 is prevented from getting into a situation where the collected liquid cannot be discharged through the drain outlet 17 due to freezing of the collected liquid in cold climate areas.

Figure 5:
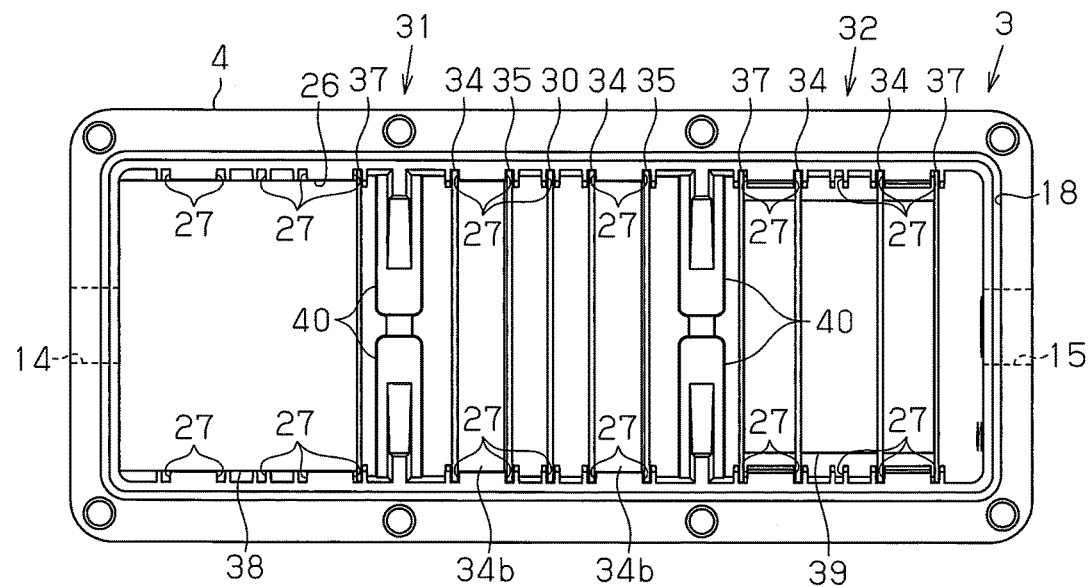
FIG. 5 is a plan view illustrating a mounting structure of the oil separator of FIG. 3.
Figure 6:
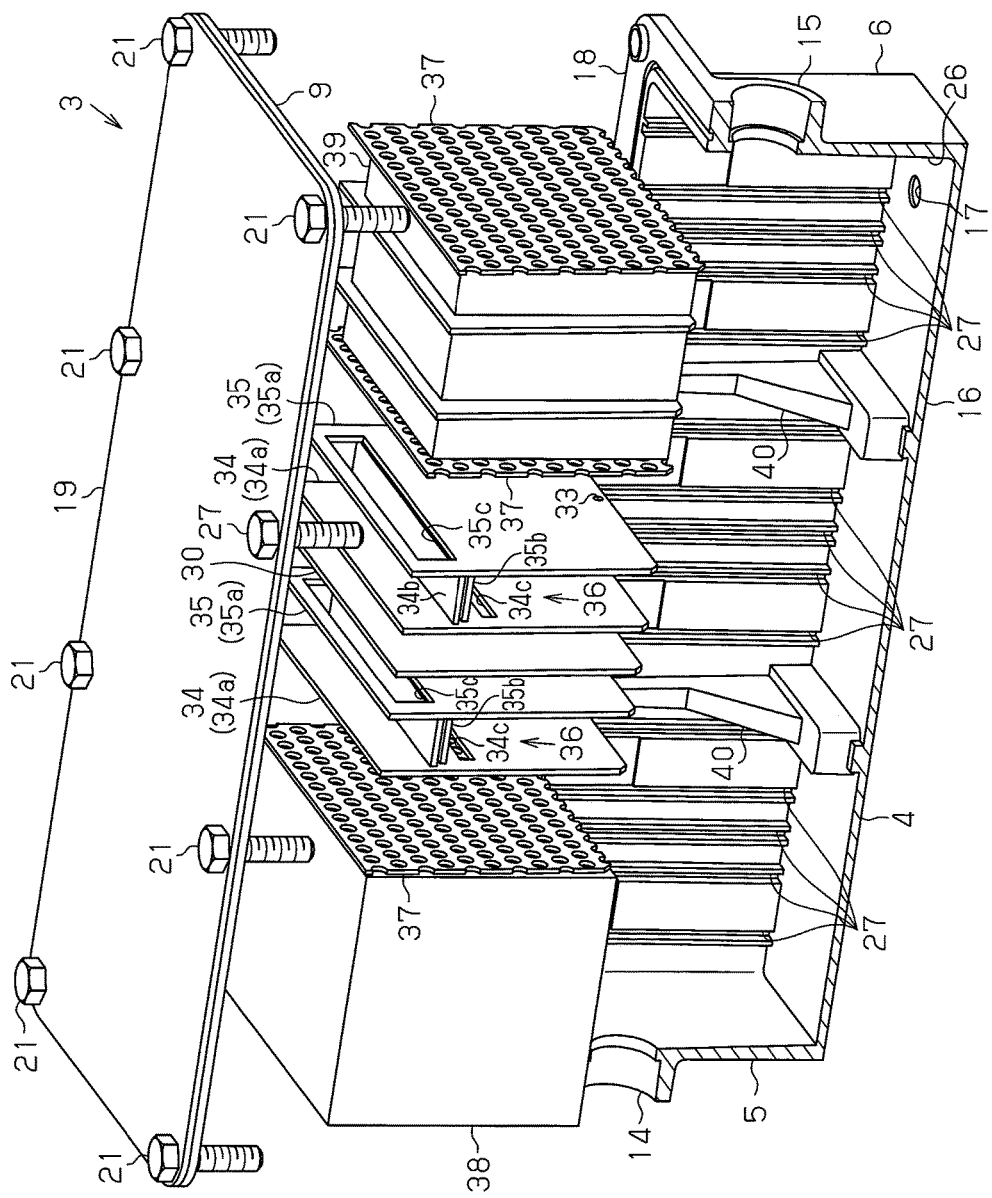
FIG. 6 is an exploded perspective view illustrating a mounting structure of the oil separator of FIG. 3.

As shown in FIGS. 5 and 6, pairs of mounting grooves 27 are formed in a pair of inner walls 26, which extends in the longitudinal direction of the housing 4, as mounting structures for mounting, for example, the partition wall 30, the impingement plates 34, 35, the urethane foam 38, and the crushed aluminum member 39. The partition wall 30 and the impingement plates 34, 35 are inserted in the mounting grooves 27 from the opening portion 18 of the housing 4 to be mounted on the housing 4. The second impingement plate 35 is inserted to be mounted on the housing 4, and then the first impingement plate 34 is inserted to be mounted on the housing 4. The urethane foam 38 and the crushed aluminum member 39 are mounted on the housing 4 by inserting the punched metal plates 37 in the mounting grooves 27 from the opening portion 18 of the housing 4. Thus, according to the oil separator 3 of the present embodiment, the mounting positions of the partition wall 30, the impingement plates 34, 35, the urethane foam 38, and the crushed aluminum member 39 can be changed by selecting any of the mounting grooves 27. In the oil separator 3, a combination of the partition wall 30, the impingement plates 34, 35, the urethane foam 38, and the crushed aluminum member 39 to be mounted on the housing 4 can be selected. Thus, it is easy to respond to specification requirements.

Operation of the above-mentioned oil separator will now be described with reference to FIG. 7.

Figure 7:
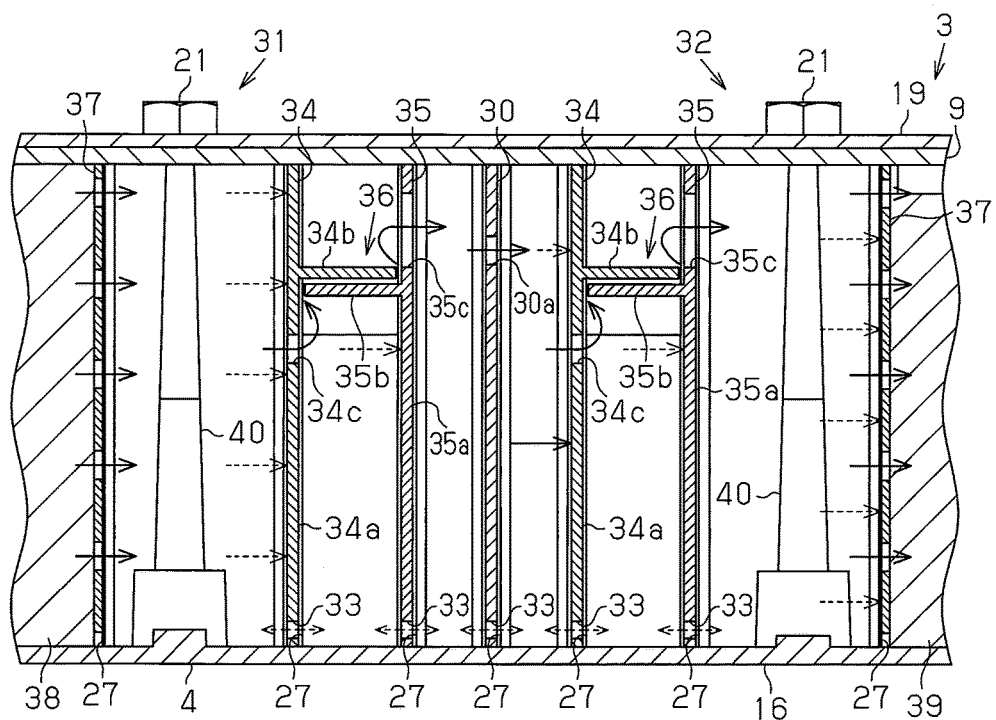
FIG. 7 is a vertical cross-sectional view illustrating the flow of air in the oil separator of FIG. 3.

As shown in FIG. 7, the air introduced from the inlet 14 into the primary expansion chamber 31 passes through the urethane foam 38 while the oil and the water are trapped by the urethane foam 38, and then passes through the first through hole 34c of the first impingement plate 34 in the primary expansion chamber 31. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The air that has passed through the extremely narrow section 36 passes through the second through hole 35c of the second upright plate 35a toward the orifice hole 30a of the partition wall 30, and passes through the orifice hole 30a. At this time, the oil and the water that has struck the partition wall 30 are separated from the air.

The air that has passed through the orifice hole 30a in the partition wall 30 passes through the first through hole 34c of the first upright plate 34a in the secondary expansion chamber 32. At this time, the oil and the water that have struck the first upright plate 34a are separated from the air. The air that has passed through the first through hole 34c flows toward the extremely narrow section 36, which is formed by the first baffle plate 34b and the second baffle plate 35b, and passes through the extremely narrow section 36. At this time, the oil and the water that have struck the second upright plate 35a and the second baffle plate 35b are separated from the air.

The air that has passed through the extremely narrow section 36 passes through the second through hole 35c of the second upright plate 35a toward the crushed aluminum member 39, and passes through the crushed aluminum member 39. At this time, the air introduced into the crushed aluminum member 39 passes through the crushed aluminum member 39 while the oil and the water are further trapped by the crushed aluminum member 39, and cleaned air that does not contain oil is discharged to the outside from the outlet 15.

The above-described embodiment has the following advantages.

(1) The expansion chambers 31, 32 are connected in series from the inlet 14 to the outlet 15 and form a multi-stage expansion chamber. Since the impingement plates 34, 35 are provided in the internal space of each of the expansion chambers 31, 32, oil and water contained in the air strike the impingement plates 34, 35 and are separated from the air in each of the expansion chambers 31, 32. The oil and the water contained in the air also strike the partition wall 30, which defines the expansion chambers 31, 32, and are separated from the air. Furthermore, since the velocity of the air that has passed through the orifice hole 30a, which is formed in the partition wall 30, is increased, heavy oil and water particles easily strike the impingement plate 34 located immediately after the orifice hole 30a in the flowing direction. Thus, the oil and the water separated in the secondary expansion chamber 32, which is a latter stage located after the partition wall 30, is increased. Also, by providing the orifice hole 30a, a liquid in an emulsified state, which is hard to pass through the orifice hole 30a, is stored in the primary expansion chamber 31, which is a former stage located prior to the partition wall 30. Thus, since the oil and the water separated in the expansion chambers 31, 32 increase, more oil and water are separated by the apparatus as a whole.

(2) Since the inlet 14 and the outlet 15 are formed on the surface of the housing 4 that is perpendicular to the horizontal direction, the inlet 14 and the outlet 15 are not provided on the bottom face 16. Thus, the separated oil and water can be stored. Also, since tubes are not connected to the upper surface or the bottom face in the vertical direction, the vertical length is prevented from being increased.

(3) Since the expansion chambers 31, 32 are arranged next to each other in the horizontal direction, projection in the vertical direction is reduced. This suppresses the influence on other members during installation on a vehicle. For example, when installing the oil separator under a cargo space of a truck, the volume of the cargo space is ensured to be as large as possible.

(4) Since the communication holes 33 are formed at the lower section of the impingement plates 34, 35 and the partition wall 30, the separated oil and water are not separately stored in each of the expansion chambers 31, 32, but are collectively stored in the expansion chambers 31, 32. This increases the usability of the volume used for storing oil and water.

An oil separator according to a second embodiment will now be described with reference to FIGS. 9 to 13. The oil separator is applied to an exhaust system of an air dryer.

Figure 9:
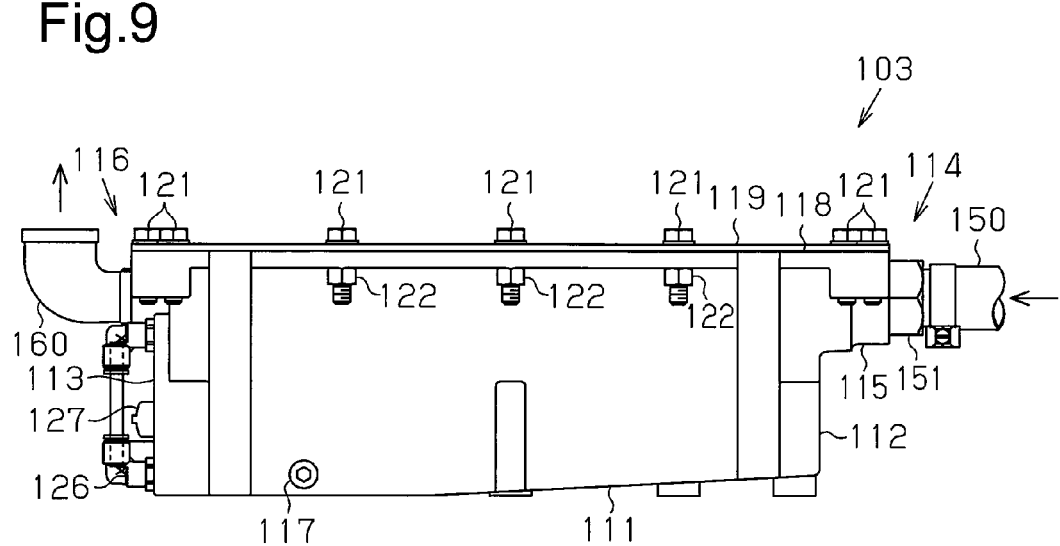
FIG. 9 is a side view illustrating the external structure of an oil separator according to a second embodiment of the present invention.

As shown in FIG. 9, an oil separator 103 includes a rectangular parallelepiped housing 111, which extends in the horizontal direction. An inlet 114 and an outlet 116 are respectively formed in a front side 112 and a rear side 113 of the housing 111. The front side 112 and the rear side 113 are opposed to each other in the longitudinal direction. That is, air passes through the oil separator 103 from right to left in FIG. 9.

Figure 10:
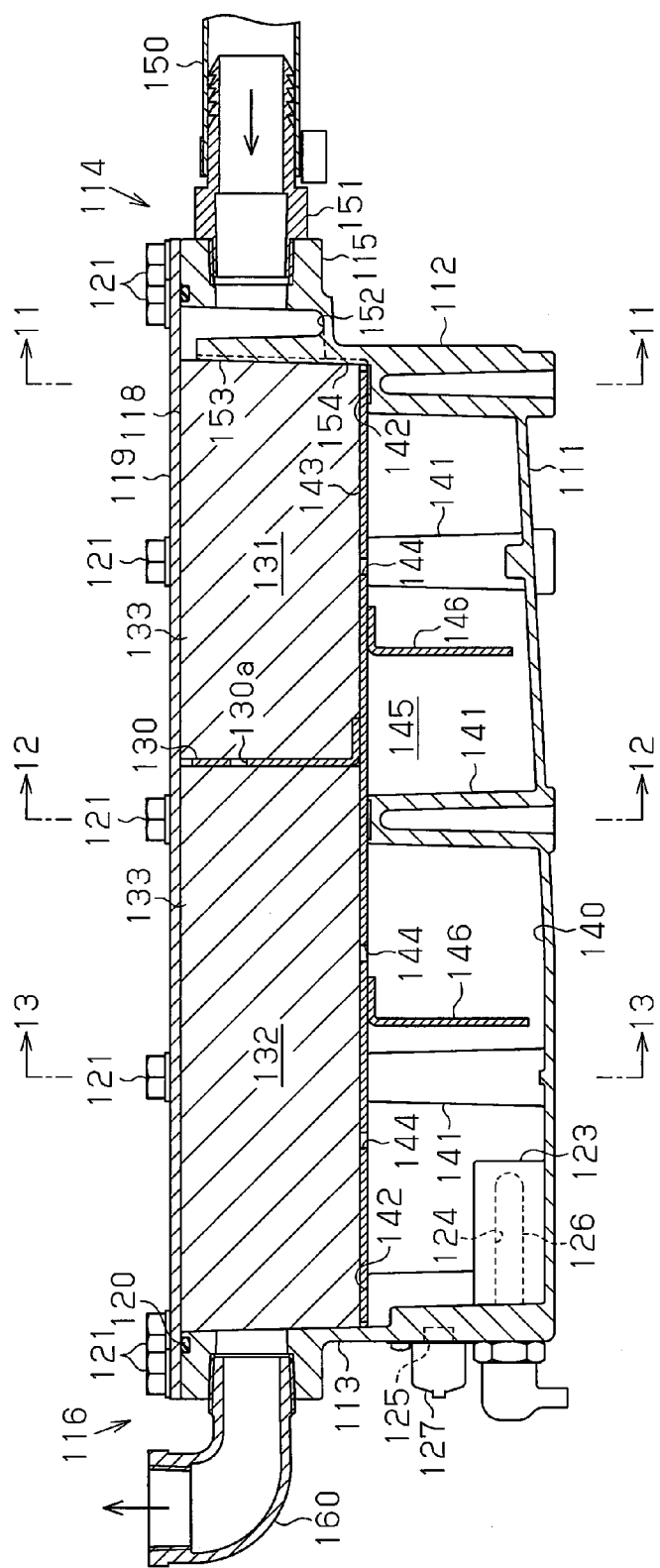
FIG. 10 is a vertical cross-sectional view illustrating the internal structure of the oil separator of FIG. 9.

As shown in FIG. 10, support members (support columns 141, steps 142), which support a liquid communication plate 143, are provided on a bottom face 140 of the housing 111.

Figure 11:
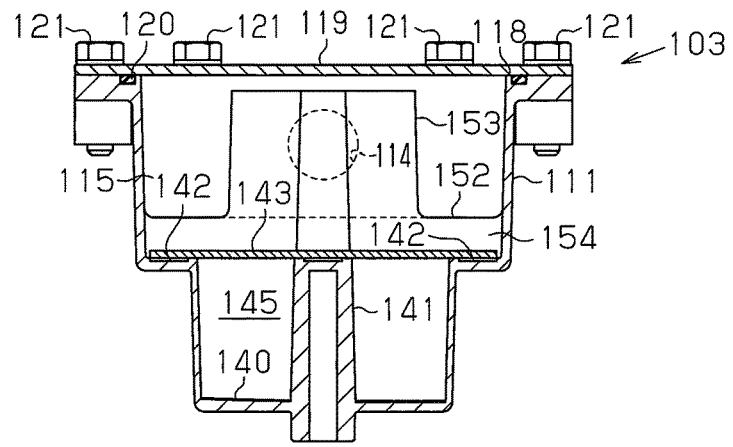
FIG. 11 is a cross-sectional view taken along line 11-11 of FIG. 10.

As shown in FIG. 11, three support members are arranged in the widthwise direction on the inner wall in the housing 111 close to the inlet 114. The support column 141 is provided at the center in the widthwise direction, and the steps 142 are respectively provided on the inner walls. Also, two support members are arranged in the widthwise direction on the inner wall in the housing 111 close to the outlet 116. The steps 142 are respectively provided on the inner walls.

Figure 12:
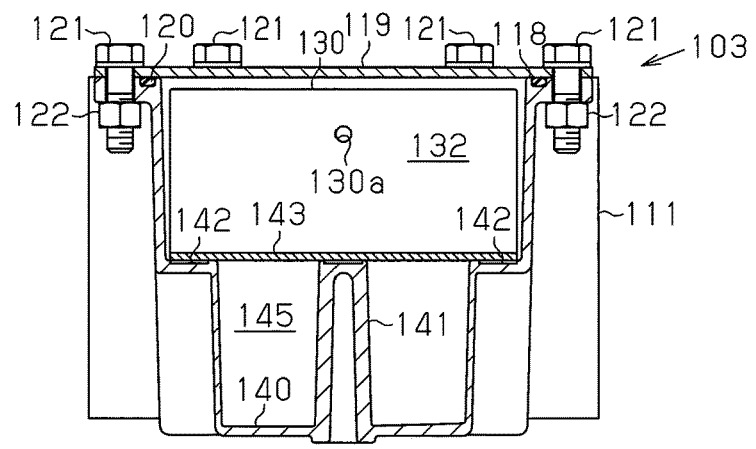
FIG. 12 is a cross-sectional view taken along line 12-12 of FIG. 10.

As shown in FIG. 12, three support members are arranged in the widthwise direction at the middle portion of the housing 111 between the inlet 114 and the outlet 116. The support column 141 is provided at the center in the widthwise direction, and the steps 142 are respectively provided on the inner walls.

Figure 13:
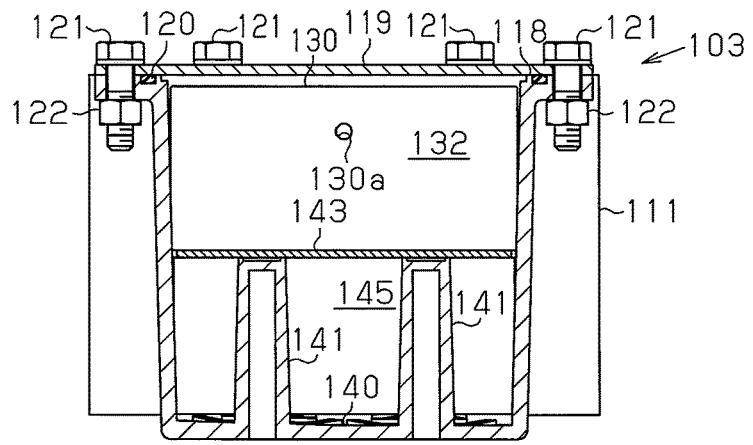
FIG. 13 is a cross-sectional view taken along line 13-13 of FIG. 10.

As shown in FIG. 13, two support columns 141 are arranged in the widthwise direction between the outlet 116 and the middle portion of the housing 111 between the inlet 114 and the outlet 116. Also, three support columns 141 are arranged in the widthwise direction between the middle portion and the inlet 114. In FIGS. 11 to 13, illustration of the urethane foams 133 is omitted.

As shown in FIG. 10, the liquid communication plate 143 is mounted on the support columns 141 and the steps 142 in a bridging manner in the housing 111. The section in the housing 111 above the liquid communication plate 143 functions as an expansion chamber, which permits air introduced through the inlet 114 to pass through. The section in the housing 111 below the liquid communication plate 143 functions as a collected liquid storage portion 145, which stores oil and water (collected liquid) separated from the air in the expansion chamber. The collected liquid storage portion 145 is capable of storing the collected liquid to the lower surface of the liquid communication plate 143.

A plate-like partition wall 130 is mounted on the upper surface of the liquid communication plate 143 in the middle between the inlet 114 and the outlet 116. An orifice hole 130a is formed at the upper section of the partition wall 130. The partition wall 130 functions as an orifice with the orifice hole 130a. The section in the housing 111 above the liquid communication plate 143 is divided into a primary expansion chamber 131 close to the inlet 114 and a secondary expansion chamber 132 close to the outlet 116 in the horizontal direction by the partition wall 130. The volume of the secondary expansion chamber 132 is greater than the volume of the primary expansion chamber 131. Thus, the saturated vapor pressure in the secondary expansion chamber 132 is further reduced as compared to that of the primary expansion chamber 131. This causes the oil and the water to easily condense, increasing the mass of particles of the oil and the water and allowing them to easily strike an impingement member. A urethane foam (such as a sponge) 133 is arranged in each of the primary expansion chamber 131 and the secondary expansion chamber 132. The air introduced through the inlet 114 strikes the urethane foams 133, causing the oil and the water to be separated from the air. That is, the urethane foams 133 trap the oil and the water contained in the air. The urethane foams 133 correspond to the impingement member.

Liquid communication holes 144 are formed in the liquid communication plate 143. The liquid communication holes 144 allow the oil and the water separated in the primary expansion chamber 131 and the secondary expansion chamber 132 to pass to the collected liquid storage portion 145. At least one of the liquid communication holes 144 is formed corresponding to each of the expansion chambers 131, 132. The oil and the water separated from the air by striking the urethane foams 133 flow along the upper surface of the liquid communication plate 143 and drop through any of the liquid communication holes 144 into the collected liquid storage portion 145.

Two baffle plates 146, which restrict the flow of the collected liquid stored in the collected liquid storage portion 145, are mounted on the lower surface of the liquid communication plate 143. The baffle plates 146 extend in the widthwise direction. The baffle plates 146 restrict the collected liquid stored in the collected liquid storage portion 145 from moving due to changes in the vehicle acceleration, thus suppressing splashing of the collected liquid.

Furthermore, an opening portion 118 is formed in the upper surface of the housing 111. The opening portion 118 is closed by a rectangular lid 119. At the top of the opening portion 118, an O-ring 120 is provided along the entire circumference of the opening portion 118. The O-ring 120 is sandwiched between the opening portion 118 and the lid 119. The lid 119 and the housing 111 are tightly secured with bolts 121 and nuts 122. The lid 119 restricts movement of, for example, the urethane foams 133 accommodated in the housing 111.

An accommodation portion 123 for accommodating heating means, which is a heater 126 in this embodiment, is provided on the bottom face 140 in the housing 111 close to the outlet 116. In the accommodation portion 123, an insertion section 124 for inserting the heater 126 opens in the rear side 113 of the housing 111. The heater 126 is columnar and is inserted in the accommodation portion 123 from the rear side 113. The heater 126 is connected to a power supply. A mounting hole 125 for mounting a thermostat 127 is formed in the rear side 113 of the housing 111 above the insertion section 124. The thermostat 127 is mounted on the mounting hole 125, and is connected to the power supply and the heater 126. The thermostat 127 detects the temperature of the collected liquid storage portion 145, and controls heating of the heater 126 based on the detected temperature. The water contained in the collected liquid that is stored at the bottom face 140 of the collected liquid storage portion 145 is evaporated as much as possible by heating the collected liquid storage portion 145 with the heater 126 so that liquid containing high concentration of oil is generated.

An introduction portion 115 is formed at the upper section of the front side 112 of the housing 111. The flow path cross-sectional area of the introduction portion 115 is smaller than the flow path cross-sectional area of the housing 111. The inlet 114 is formed in the introduction portion 115. A cylindrical mounting member 151 is secured to the distal end of the inlet 114. The distal end of a hose 150, which is connected to the air dryer 2, is connected to the distal end of the mounting member 151.

An L-shaped elbow member 160 is mounted to the outlet 116. The elbow member 160 extends in the horizontal direction from the outlet 116 and bends upward. The elbow member 160 is screwed to the outlet 116.

As shown in FIG. 11, a restricting plate 153, which restricts reverse flow of the collected liquid from the inside of the housing 111 to the inlet 114, is provided in front of the introduction portion 115. The restricting plate 153 extends from an inner bottom face 152 of the introduction portion 115 and stands upright into the introduction portion 115. The inner bottom face 152 is located above the upper surface of the liquid communication plate 143. Thus, a step 154 is provided on the inner end of the introduction portion 115 to form a step with respect to the liquid communication plate 143. The height of the step 154 restricts reverse flow of the collected liquid. Also, the collected liquid splashed by changes in the vehicle acceleration and vibration is restricted from directly entering the inlet 114 by the restricting plate 153. That is, the restricting plate 153 and the step 154 function as restricting members, which restrict the collected liquid stored in the collected liquid storage portion 145 from flowing back to the inlet 114.

Operation of the above-mentioned oil separator will now be described.

Purge air discharged from the air dryer 2 is introduced to the oil separator 103. The purge air is air containing oil and water.

The air introduced into the primary expansion chamber 131 through the inlet 114 flows through the associated urethane foam 133 while oil and water are trapped by the urethane foam 133. At this time, the oil and the water that have struck the urethane foam 133 are separated from the air. A liquid containing the water and the oil trapped by the urethane foam 133 moves in the urethane foam 133, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the urethane foam 133 in the primary expansion chamber 31 flows toward the orifice hole 130a of the partition wall 130, and passes through the orifice hole 130a. At this time, the oil and the water that have struck the partition wall 130 are separated from the air. The liquid that has struck the partition wall 130 and has been separated from the air moves along the partition wall 130, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the orifice hole 130a of the partition wall 130, passes through the urethane foam 133 in the secondary expansion chamber 132 while the oil and the water are trapped by the associated urethane foam 133. At this time, the oil and the water that have struck the urethane foam 133 are separated from the air. The liquid containing the water and the oil trapped by the urethane foam 133 moves in the urethane foam 133, reaches the upper surface of the liquid communication plate 143, drops through the liquid communication holes 144 formed in the liquid communication plate 143 into the collected liquid storage portion 145, and is stored in the collected liquid storage portion 145.

The air that has passed through the urethane foam 133 of the secondary expansion chamber 132 becomes cleaned air containing no oil and is discharged to the outside through the outlet 116.

The collected liquid stored in the collected liquid storage portion 145 is heated by the heater 126. This evaporates the water in the collected liquid, and therefore the collected liquid containing a high concentration of oil is discharged from the drain outlet 117.

Vibration caused during travel of the vehicle is transmitted to the oil separator 103. The oil separator 103 tilts in the same manner as tilting of the vehicle. Thus, the collected liquid stored in the collected liquid storage portion 145 is influenced by the behavior of the vehicle. According to the oil separator 103 of the present embodiment, since the step 154 is provided in addition to the restricting plate 153 provided in the introduction portion 115, if the collected liquid flows from the inside of the housing 111 toward the inlet 114 due to changes in the travel acceleration of the vehicle or inclination of the vehicle, the step 154 and the restricting plate 153 restrict the collected liquid from flowing into the inlet 114. Even if the collected liquid attempts to move in the longitudinal direction of the housing 111 due to changes in the travel acceleration of the vehicle, the baffle plates 146 restrict the movement of the collected liquid. Thus, since the movement of the collected liquid is restricted, changes in the liquid surface of the collected liquid are reduced. This reduces flowing of the collected liquid into the inlet 114 from the inside of the housing 111, and suppresses splashing of the collected liquid due to liquid striking the inner wall of the housing 111. Since the restricting plate 153 is formed only in front of the inlet 114, and the sides are open, the introduction amount of the air is ensured while restricting the collected liquid from flowing into the inlet.

The above-described embodiment has the following advantages.

(5) The restricting plate 153 is formed in the introduction portion 115. Since the collected liquid containing oil is restricted from flowing into the inlet 114 from the inside of the housing 111 by the restricting plate 153, which limits the flow of the collected liquid into the inlet 114.

(6) The restricting plate 153 located in front of the inlet 114 extends from the inner bottom face 152 of the introduction portion 115 to stand upright into the introduction portion 115. The collected liquid containing oil is restricted from flowing into the inlet 114 from the inside of the housing 111 by the restricting plate 153, which limits the flow of the collected liquid into the inlet 114. Also, since the restricting plate 153 is located in front of the inlet 114, the collected liquid needs to go around the restricting plate 153 to flow into the inlet 114. Thus, the collected liquid is prevented from easily flowing into the inlet 114. Furthermore, since the restricting plate 153 is located in front of the inlet 114, the collected liquid that is splashed in the housing 111 strikes the restricting plate 153. This restricts the collected liquid from entering the inlet 114.

(7) The step 154 is formed between the inner bottom face 152 of the introduction portion 115 and the liquid communication plate 143. Thus, when the housing 111 tilts due to tilting of the vehicle, even if the collected liquid containing oil flows toward the introduction portion 115 from the inside of the housing 111, the step 154 restricts the flow of the collected liquid into the inlet 114. This limits the flow of the collected liquid into the inlet 114.

(8) Since the baffle plates 146 are provided, even if the collected liquid containing oil attempts to move due to changes in the travel acceleration of the vehicle, the movement of the collected liquid is restricted. This suppresses splashing of the collected liquid.

An oil separator according to a third embodiment will now be described with reference to FIGS. 16 to 20. The oil separator is applied to an exhaust system of an air dryer.

Figure 16:
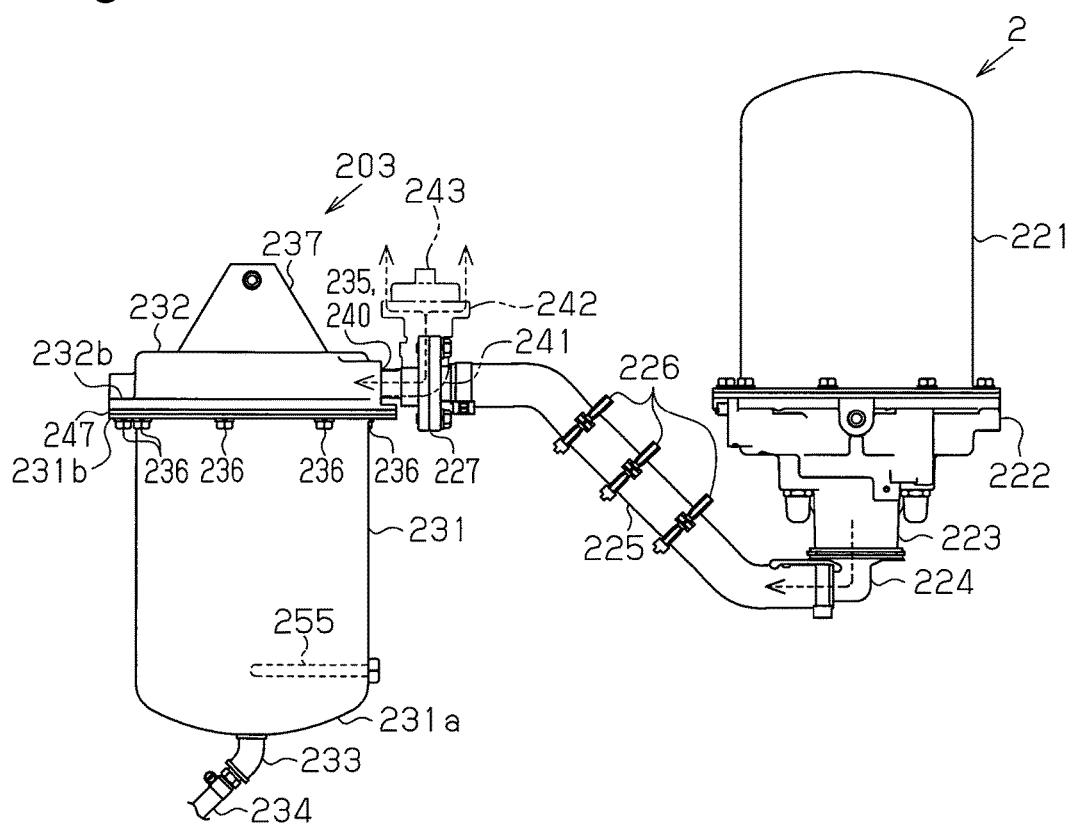
FIG. 16 is a diagram illustrating a connection state of an oil separator and an air dryer according to a second embodiment of the present invention.

As shown in FIG. 16, the air dryer 2 includes a cylindrical case 221 having a vertically upper end closed, and a support member 222, which closes the opening portion of the case 221 and supports the case 221. A purge air outlet 223, which discharges purge air when regenerating a desiccant, is formed at the lower section of the support member 222. A purge air discharge cover 224, to which a connecting hose 225 is connected, is attached to the purge air outlet 223. The connecting hose 225 is connected to an oil separator 203. The connecting hose 225 is secured to, for example, the chassis of a vehicle with clips 226. An inlet (not shown), which introduces compressed air compressed by the compressor 1, and an outlet (not shown), which discharges dried compressed air, are formed in the support member 222 of the air dryer 2.

The oil separator 203 includes a cylindrical housing having a closed end and extending in the vertical direction, which is a case 231 in this embodiment, and a lid 232, which closes the opening portion of the case 231. A drain outlet 233 for draining the collected liquid that has been stored is provided at a bottom portion 231a of the case 231. A drain hose 234, which is used when draining the collected liquid, is connected to the drain outlet 233. The lid 232 has an inlet 235 for introducing the purge air from the air dryer 2 through the connecting hose 225, and an outlet 240 for discharging cleaned air from which oil has been separated. The inlet 235 and the outlet 240 are formed separately. The inlet 235 and the connecting hose 225 are connected to each other by a coupling member 227.

The inlet 235 of the oil separator 203 is located above the connection port of the purge air discharge cover 224 in the vertical direction. Thus, the overall height of the air dryer 2 and the oil separator 203 is reduced in the vertical direction.

An elbow member 241, which extends in the horizontal direction and bends vertically upward, is connected to the outlet 240 of the oil separator 203. A drip preventing member 242 and a cover 243 for preventing entry of foreign matter are mounted on the distal end of the elbow member 241.

Figure 17:
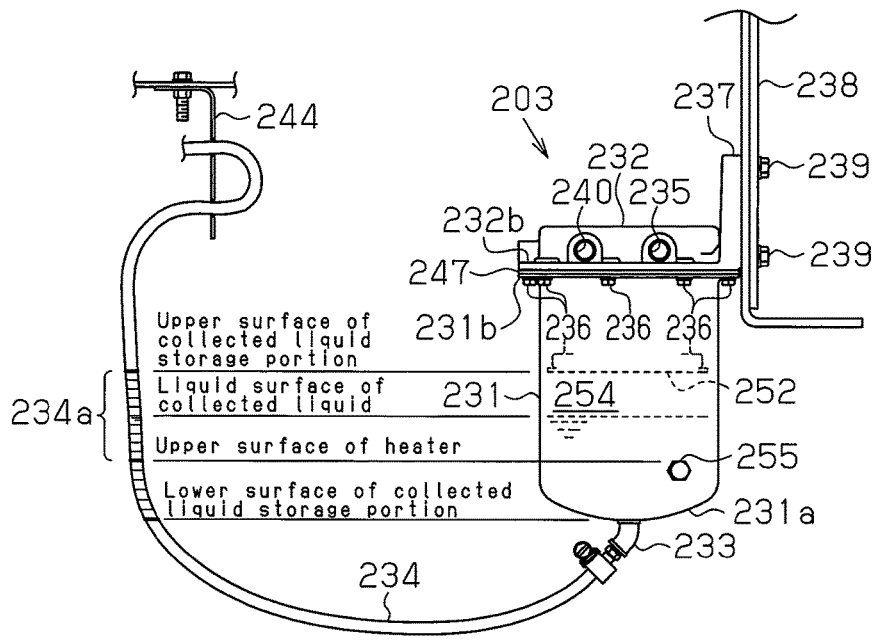
FIG. 17 is a view illustrating a mounting state of the oil separator of FIG. 16.

As shown in FIG. 17, a mounting member 237 is formed integrally with the lid 232 of the oil separator 203 to extend upright from the lid 232. The mounting member 237 is secured to a chassis 238 with bolts 239.

Also, the distal end of the drain hose 234 is hooked to a support plate 244, which is secured to, for example, the chassis of a vehicle. The distal end of the drain hose 234 is located above the lid 232 of the oil separator 203.

Figure 18:
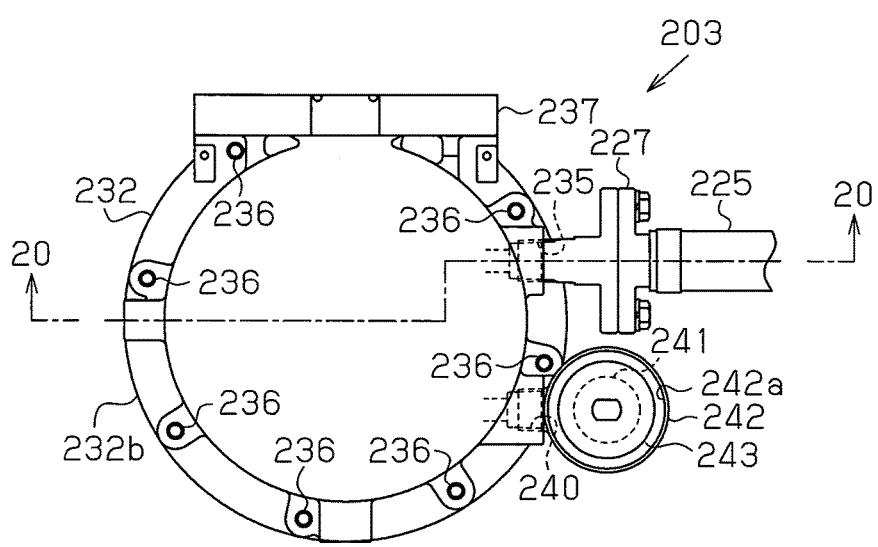
FIG. 18 is a top view illustrating the position of an inlet and an outlet of the oil separator of FIG. 16.

As shown in FIG. 18, the lid 232 has the inlet 235 and the outlet 240, which are open in the same direction. The connecting hose 225 is connected to the inlet 235 via the coupling member 227. The elbow member 241 is connected to the outlet 240. That is, the coupling member 227 and the elbow member 241 are arranged next to each other.

Figure 19:
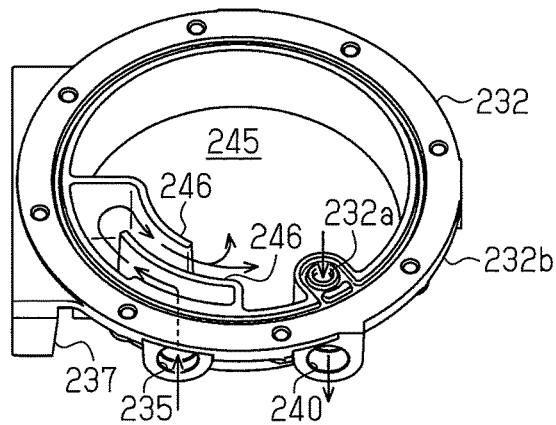
FIG. 19 is a bottom perspective view illustrating the inside of the lid of the oil separator of FIG. 16.

As shown in FIG. 19, the lid 232 is a cylinder having a vertically upper end closed. Two baffle plates 246 are provided on the inner wall of the lid 232 in the vicinity of the inlet 235 to be perpendicular to the flow direction of the purge air introduced through the inlet 235. The internal space of the lid 232 functions as a first expansion chamber 245, which expands the purge air introduced through the inlet 235. The lid 232 has a communication section 232a, which connects the inside of the case 231 to the outlet 240.

Figure 20:
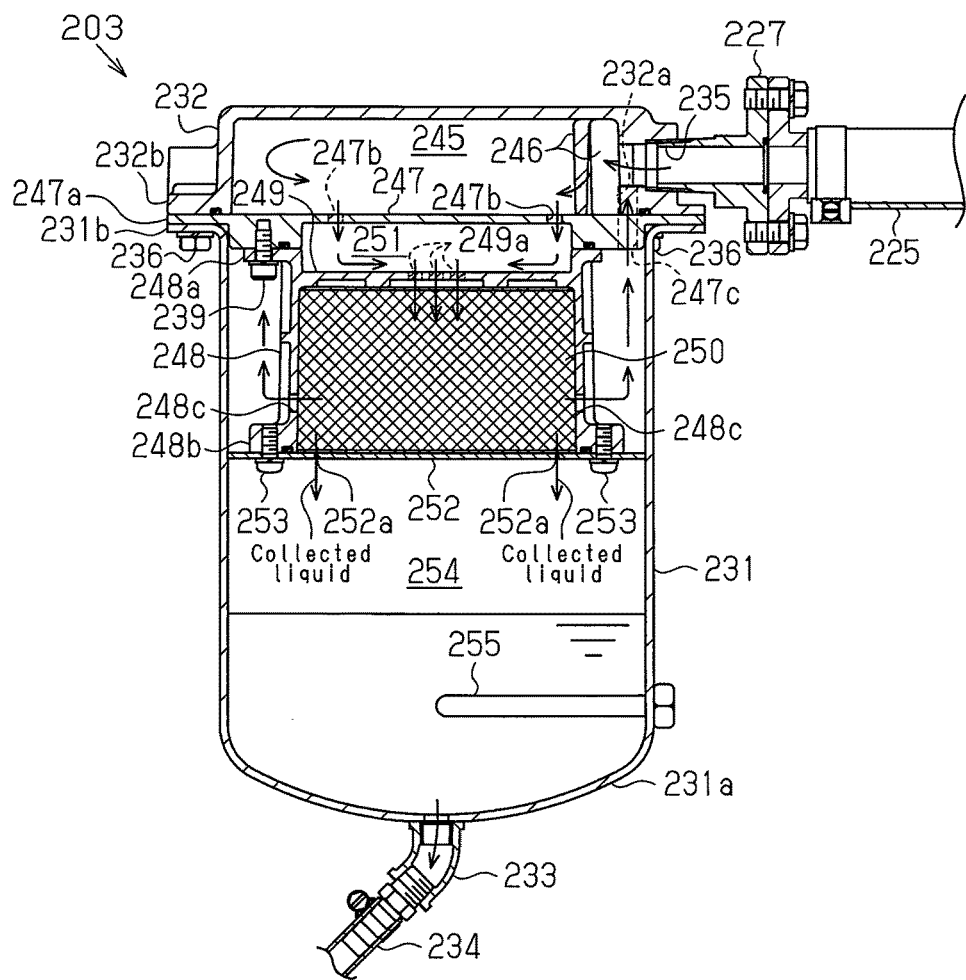
FIG. 20 is a cross-sectional view taken along line 20-20 of FIG. 18.

As shown in FIG. 20, a disk-like cover 247, which closes the case 231 and the opening portion of the lid 232, is provided between the case 231 and the lid 232. The cover 247 and the case 231 are fastened to the lid 232 with bolts 236. That is, the bolts 236 are fastened to threaded bores formed in a flange portion 232b provided on the lid 232. Furthermore, the threaded portions of the bolts 236 extend through through-holes formed in a flange portion 231b provided on the case 231. The cover 247 has through-holes through which the threaded portions of the bolts 236 extend. Thus, threaded portions of the bolts 236 extend through the through-holes of the flange portion 231b of the case 231 and the through-holes of a flange portion 247a of the cover 247. The bolts 236 are then screwed to the threaded bores of the flange portion 232b of the lid 232 so that the lid 232, the cover 247, and the case 231 are fastened together. The cover 247 has a communication hole 247c, which connects the inside of the case 231 to the outlet 240.

The space formed by the lid 232 and the cover 247 functions as the first expansion chamber 245. A cylindrical accommodation member 248 having a vertically upper end closed is secured to the cover 247 with bolts 236. The accommodation member 248 accommodates a urethane foam 250 such as a sponge. The urethane foam 250 functions as an impingement member. A flange portion 248a is formed at the upper edge of the accommodation member 248 and a flange portion 248b is formed at the lower edge of the accommodation member 248. The bolts 236 extend through the flange portion 248a formed at the upper edge of the accommodation member 248 so that the accommodation member 248 is fastened to the cover 247. The space formed by the cover 247 and upper surface of the accommodation member 248 functions as a second expansion chamber 251. The cover 247 has through holes 247b, which connect the first expansion chamber 245 to the second expansion chamber 251. Through holes 249a are formed at the center portion of an upper base 249 of the accommodation member 248. The through holes 247b of the cover 247 and the through holes 249a of the upper base 249 of the accommodation member 248 are formed at positions that are not opposed to each another. Through holes 248c are formed at the lower end of the side face of the accommodation member 248 to be spaced apart in the radial direction.

A disk-like support lid 252 is secured to the flange portion 248b, which is formed at the lower edge of the accommodation member 248, with screws 253. The support lid 252 supports the accommodated urethane foam 250. The inner diameter of the support lid 252 is substantially the same as the inner diameter of the case 231. The support lid 252 has through holes 252a, which permit the oil and the water removed by the urethane foam 250 to drop. Thus, the lower section in the case 231 functions as a collected liquid storage portion 254. A heater 255 is arranged in the collected liquid storage portion 254. The heater 255 evaporates water by heating the collected liquid that has been stored in the collected liquid storage portion 254. Heating of the heater 255 is controlled by a non-illustrated thermostat.

The drain hose 234 is transparent, and has a scale 234a corresponding to the volume of the collected liquid storage portion 254. For example, the scale 234a is provided corresponding to the upper surface of the collected liquid storage portion 254, the upper surface of the heater 255, and the lower surface of the collected liquid storage portion 254. The amount of the collected liquid in the collected liquid storage portion 254 is easily grasped by visually checking the amount of the collected liquid in the drain hose 234.

Operation of the above-mentioned oil separator will now be described.

As shown in FIG. 16, the purge air discharged from the air dryer 2 is introduced to the oil separator 203. The purge air contains oil and water.

As shown in FIG. 19, the purge air introduced through the inlet 235 strikes the baffle plates 246, is introduced into the oil separator 203 along the baffle plates 246, and expands in the first expansion chamber 245.

As shown in FIG. 20, the air expanded in the first expansion chamber 245 enters the second expansion chamber 251 via the through holes 247b formed in the cover 247. The air that has expanded in the second expansion chamber 251 enters the accommodation member 248 via the through holes 249a of the upper base 249 of the accommodation member 248. At this time, the oil and the water that have struck the urethane foam 250 are separated from the air. The liquid that contains the water and the oil trapped by the urethane foam 250 moves through the urethane foam 250. The liquid reaches the upper surface of the support lid 252, drops through the through holes 252a of the support lid 252 into the collected liquid storage portion 254, and is stored in the collected liquid storage portion 254. The collected liquid that has stored in the collected liquid storage portion 254 enters the drain hose 234 through the drain outlet 233. The collected liquid stored in the collected liquid storage portion 254 is heated by the heater 255. This evaporates the water in the collected liquid. Furthermore, the amount of the collected liquid stored in the collected liquid storage portion 254 can be grasped by checking the amount of the collected liquid stored in the drain hose 234. When the amount of the collected liquid approaches the upper limit, the collected liquid is drained from the collected liquid storage portion 254 through the drain hose 234.

The oil and the water are separated from the air that has entered the accommodation member 248 from the through holes 249a in the upper base 249 of the accommodation member 248. The air then enters the case 231 from the through holes 248c on the side face of the accommodation member 248. The air that has entered the case 231 passes through the communication hole 247c of the cover 247 and the communication section 232a of the lid 232, and is discharged to the atmosphere through the outlet 240. Thus, the air that has entered the case 231 hardly contacts the collected liquid in the collected liquid storage portion 254, and is discharged from the outlet 240. The air that is discharged from the outlet 240 is cleaned air that does not contain oil.

The above-described embodiment has the following advantages.

(9) The inlet 235 and the outlet 240 are provided in the lid 232 at the upper section of the housing. Thus, the air introduced into the case 231 through the inlet 235 enters the accommodation member 248 from vertically above, and is discharged sideways of the accommodation member 248. Cleaned air is discharged through the outlet 240 via the communication section 232a. Also, the collected liquid storage portion 254 is located below the accommodation member 248. Thus, the air discharged from the sides of the accommodation member 248 is prevented from contacting the collected liquid stored in the collected liquid storage portion 254 located below the accommodation member 248. This prevents the passing air from catching the oil.

(10) Since the baffle plates 246 are located in front of the inlet 235 in the internal space of the housing (lid 232), the velocity of the introduced air is reduced, and the air is scattered.

(11) Since the internal space of the housing is partitioned (divided) into the first expansion chamber 245 and the second expansion chamber 251, the air is repeatedly expanded so that the oil and the water contained in the air easily condense.

(12) The case 231 and the lid 232 are fastened together at the flange portions 231b, 232b in the vertical direction. Thus, the case 231 and the lid 232 are easily mounted and easily separated.

(13) Since the heater 255 is provided in the collected liquid storage portion 254, the water is evaporated by heating the collected liquid.

(14) Since the drain hose 234, which drains the collected liquid, is connected to the lower section of the case 231, the collected liquid is easily drained.

(15) Since the drain hose 234 is transparent, the amount of the collected liquid in the drain hose 234 can be grasped. Also, since the scale 234a corresponding to the volume of the collected liquid storage portion 254 is provided on the drain hose 234, the amount of the collected liquid in the collected liquid storage portion 254 is easily grasped based on the amount of the collected liquid in the drain hose 234.

The above described embodiments may be modified as follows.

In the first embodiment, the sealing sheet 20 is provided between the opening portion 18 of the housing 4 and the lid 19, but the sealing sheet 20 may be omitted. It is desirable that the sealing between the opening portion 18 of the housing 4 and the lid 19 be maintained.

In the first embodiment, the baffle plates 34*b*, 35*b*, which extend to be perpendicular to the upright plates 34*a*, 35*a*, are provided. However, as long as the extremely narrow section 36 is maintained, the baffle plates 34*b*, 35*b* do not necessarily have to be formed to be perpendicular to the upright plates 34*a*, 35*a*.

In the first embodiment, the extremely narrow section 36 configured by the pair of baffle plates 34*b*, 35*b* is provided. However, an extremely narrow section formed by multiple pairs of baffle plates may be provided.

In the first embodiment, the communication hole 33 is formed at the lower section of the partition wall 30. However, if the drain outlet 17 is formed in each of the expansion chambers 31, 32, the communication hole 33 of the partition wall 30 may be omitted.

In the first embodiment, the lid 19 restricts the movement of the impingement plates 34, 35, the partition wall 30, the urethane foam 38, and the crushed aluminum member 39. However, as long as the impingement plates 34, 35, the partition wall 30, the urethane foam 38, and the crushed aluminum member 39 are secured, the lid 19 does not necessarily have to restrict their movement.

In the first embodiment, the crushed aluminum member 39 is provided in the secondary expansion chamber 32, but the urethane foam 38 may be provided instead of the crushed aluminum member 39.

In the first embodiment, members are arranged in the housing 4 in the order of the urethane foam 38, the impingement plates 34, 35, the partition wall 30 (the orifice hole 30*a*), the impingement plates 34, 35, and the crushed aluminum member 39. However, the arrangement of the members may be changed, some of the members may be omitted, some of the members may be increased, or a member may be changed depending on the amount of oil and water discharged from the air dryer 2 (the compressor 1).

In the first embodiment, a partition that divides the inside of the housing 4 into the expansion chambers and a collected liquid storage portion may be provided on the bottom inner surface of the housing 4. In this case, the collected liquid stored at the bottom of the housing 4 is prevented from being stirred up. Also, in a case where there is a gap between the partition and the inner wall, the separated oil and water are moved to the collected liquid storage portion through the gap. If there is no gap between the partition and the inner wall, communication holes are desirably formed that permit the separated oil and water to move into the collected liquid storage portion.

In the first embodiment, the expansion chambers 31, 32 are arranged next to each other in the horizontal direction, but may be arranged next to each other in the vertical direction.

In the first embodiment, the inlet 14 is formed in the front side 5, and the outlet 15 is formed in the rear side. However, if there is a sufficient space in the vertical direction, the inlet 14 and the outlet 15 may be formed in the lid 19 on the top face or the bottom face 16.

In the first embodiment, the size, or the capacity, of the primary expansion chamber 31 and the secondary expansion chamber 32 is substantially the same. However, the capacity of the secondary expansion chamber 32 may be greater than the capacity of the primary expansion chamber 31. In this case, the saturated vapor pressure in the secondary expansion chamber 32 is further reduced, allowing the oil and the water to easily condense. This increases the mass of particles of the oil and the water, allowing them to easily strike the impingement plate. Thus, the secondary expansion chamber 32 stores more oil and water separated from the air than the primary expansion chamber 31.

In the first embodiment, a mounting component that is mountable to each mounting groove 27 may be limited by varying the groove width of each mounting groove 27 corresponding to the thickness of the mounting component for each mounting component.

In the first embodiment, the mounting grooves 27 are formed on the inner wall 26 of the housing 4 as the mounting structure. However, the mounting structure is not limited to the grooves. For example, an engaging structure may be employed.

In the first embodiment, the heaters 41 are provided in the ribs 40, but the heaters 41 may be provided at positions other than the ribs 40.

In the first embodiment, the heaters 41 are provided in the expansion chambers 31, 32, but the heater 41 may be provided in only one of the expansion chambers. Also, the number of the heaters 41 may be changed as required. Furthermore, if the heaters 41 are unnecessary, a structure without the heaters 41 may be employed.

Figure 8:
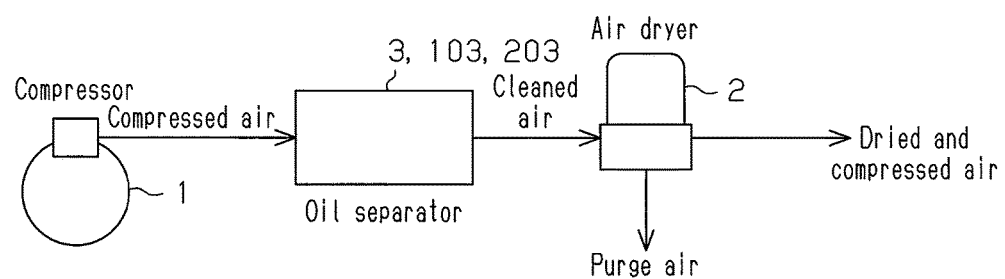
FIG. 8 is a block diagram illustrating an installation position of an oil separator according to a modification in an air system.

In the first embodiment, the oil separator 3 is provided in the exhaust system of the air dryer 2, which is downstream of the compressor 1 of the air system. However, as shown in FIG. 8, the oil separator 3 may be provided downstream of the compressor 1 of the air system and upstream of the air dryer 2. In this case, oil and water are separated from the air containing lubricant in the compressor 1, and cleaned air is supplied to the air dryer 2. Thus, the desiccant in the air dryer 2 is prevented from being deteriorated due to the oil.

In the above described embodiments, the oil separator 3, 103, 203 are provided in the air system including the air dryer 2 in a vehicle such as trucks, buses, and construction machines. However, the oil separator 3, 103, 203 may be used in any situation as long as it is for use in separating oil from air containing oil and water. For example, the oil separator may clean exhaust gas to the atmosphere from an air dryer that dries compressed air in, for example, a plant.

In the configuration of the second embodiment, at the lowermost section of the restricting plate 153, a micro through hole is preferably provided that introduces the liquid stored between the inlet 114 and the restricting plate 153 into the primary expansion chamber 131.

Figure 14:
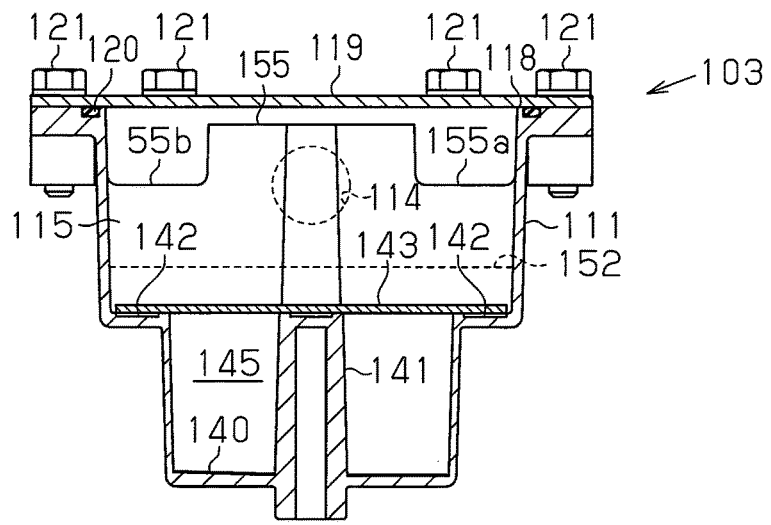
FIG. 14 is a transverse cross-sectional view illustrating the internal structure of an oil separator according to a modification.

In the second embodiment, the restricting plate 153 is formed only in front of the inlet 114 and spaces are formed on the sides of the restricting plate 153. However, a restricting plate may be employed that is not only formed in front of the inlet 114 but that also extends sideways. As shown in FIG. 14, for example, a restricting plate 155 extends upright from the inner bottom face 152 of the introduction portion 115. The restricting plate 155 is located in front of the inlet 114, and includes side portions 155*a*, 155*b*, which extend sideways to the inner side walls of the housing 111. The height of the side portions 155*a*, 155*b* of the restricting plate 155 is approximately half the length from the inner bottom face 152 to the lid 119. That is, the side portions 155*a*, 155*b* cover the lower section of the flow path of the introduction portion 115. In this case, the collected liquid that flows from the housing 111 into the inlet 114 is reliably restricted by the restricting plate 155.

Figure 15:
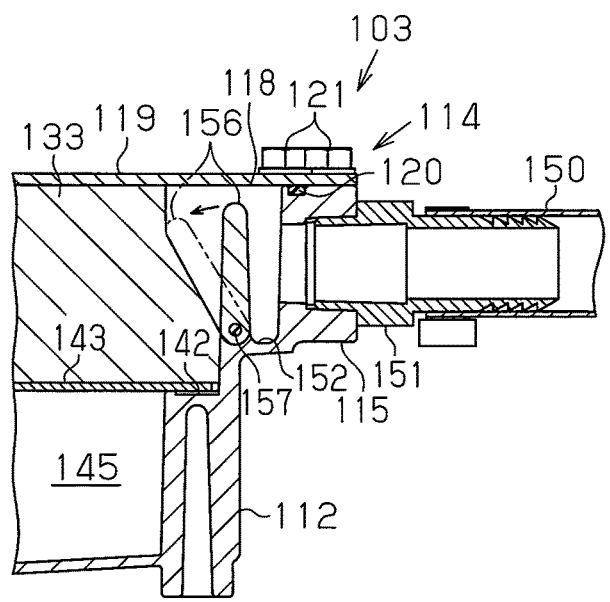
FIG. 15 is a vertical cross-sectional view illustrating the internal structure of the oil separator according to a modification in the vicinity of the inlet.

In the second embodiment, the restricting plate 153 or 155 is provided integrally with the inner bottom face 152 of the introduction portion 115. However, a backflow prevention mechanism may be provided that increases the flow path cross-sectional area when the air is introduced through the inlet 114, and restores the size of the flow path cross-sectional area when the introduction of air through the inlet 114 is stopped. For example, as shown in FIG. 15, a restricting plate 156 having the side portions is provided in the same manner as in FIG. 14, and a one-way urging mechanism 157 is provided between the restricting plate 156 and the inner bottom face 152 as the backflow prevention mechanism. The one-way urging mechanism 157 urges the restricting plate 156 toward the inlet 114 to stand vertically. When air is introduced through the inlet 114, the restricting plate 156 tilts toward the outlet 116 and increases the size of the flow path cross-sectional area. Thus, the collected liquid is prevented from flowing into the inlet 114 from the housing 111 while ensuring the flow path.

In the second embodiment, the restricting plate 153 extends upright from the inner bottom face 152 of the introduction portion 115. However, as long as the effective area of the restricting plate 153 in front of the inlet 114 is greater than the effective passage area of the inlet 114, the restricting plate 153 does not necessarily have to extend upright from the inner bottom face 152.

In the second embodiment, the step 154 is provided so that the height of the upper surface of the liquid communication plate 143 and the height of the inner bottom face 152 of the introduction portion 115 are different. However, the step 154 may be omitted.

In the second embodiment, the O-ring 120 is provided between the opening portion 118 of the housing 111 and the lid 119. However, the O-ring 120 may be omitted. It is desirable that the sealing between the opening portion 118 of the housing 111 and the lid 119 be maintained.

In the second embodiment, the lid 119 restricts the movement of the urethane foams 133. However, as long as the urethane foams 133 are secured, the movement does not necessarily have to be restricted by the lid 119.

In the second embodiment, the urethane foams 133 are provided in the primary expansion chamber 131 and the secondary expansion chamber 132. However, the urethane foams 133 may be changed or partially omitted in accordance with the amount of the oil and the water discharged from the air dryer 2 (compressor 1).

In the second embodiment, the heater 126 heats the collected liquid storage portion 145. However, the heater 126 may directly heat the collected liquid stored in the collected liquid storage portion 145. In this case, the thermostat 127 is desirably located on the inner wall of the housing 111 to perform accurate temperature control. In this case, since heat transfer from the heater 126 to the collected liquid is increased, the collected liquid is efficiently heated as compared to the case in which the collected liquid is indirectly heated.

In the configuration of the second embodiment, the number of the heater 126 may be changed as required.

In the third embodiment, the scale 234a is provided on the drain hose 234, but the scale 234a may be omitted from the drain hose 234.

In the third embodiment, the drain hose 234 is connected to the drain outlet 233 of the case 231. However, the drain hose 234 may be omitted, and a cock may be provided on the drain outlet 233 so that the collected liquid is directly discharged from the drain outlet 233.

In the third embodiment, the first expansion chamber 245 and the second expansion chamber 251 are provided in the oil separator 203. However, at least one of the first expansion chamber 245 and the second expansion chamber 251 may be provided.

In the third embodiment, a member such as a nonwoven fabric filter may be arranged upstream or downstream of the urethane foam 250, or in the expansion chambers 245, 246.

In this case, the removal rate of the oil component is increased. Furthermore, the urethane foam 250 such as a sponge or a member such as a nonwoven fabric filter may be charged with static electricity. The members can be charged with static electricity by a method such as utilizing the flow of dried air from the dryer. Also, the urethane foam 250 such as a sponge and the member such as a nonwoven fabric filter may be formed of material that is electrically charged from the beginning. In this case, the removal rate of the oil component is further increased.

In the third embodiment, the urethane foam 250 is employed as the impingement member, but other members such as a crushed aluminum member may be employed. Furthermore, instead of the expansion chamber having the impingement member, just an expansion chamber without the impingement member may be employed.

In the configuration of the third embodiment, the number of the heater 255 may be changed as required.

The invention claimed is:

1. A system comprising:
    a compressor that supplies compressed air;
    an air dryer that is connected to the compressor, and dries the compressed air supplied from the compressor and supplies dried compressed air, the air dryer comprising a supplying line that supplies the dried compressed air and an exhaust line that discharges purge air containing oil; and
    an oil separator connected to the exhaust line comprising:
    a housing including an inlet for introducing the purge air from the air dryer and an outlet for discharging cleaned air;
    an expansion chamber, which is located in the housing and expands the purge air that has been introduced through the inlet;
    an accommodation member, which is located in the housing and communicates with the expansion chamber in the vertical direction, wherein the accommodation member accommodates an impingement member and a first through hole is formed at a side face of the accommodation member; and
    a collected liquid storage portion located below the accommodation member, wherein
    the oil separator is configured to introduce purge air into the housing through the inlet, and cause the purge air to strike the impingement member to separate oil from the introduced air, thereby recovering the oil,
    the inlet and the outlet are located in an upper section of the housing,
    the accommodation member include a portion located below the inlet of the housing, and a second through hole is formed at the portion, and
    the accommodation member separates oil from the introduced purge air and discharges the separated oil downwardly via the second through hole, and discharges the cleaned air via the first through hole at the side face wherein inlet of the housing is located above the second through hole.

2. The system according to claim 1, wherein the accommodation member is configured to discharge sideways the air that has entered from the expansion chamber.

3. The system according to claim 1, wherein a baffle plate is provided that obstructs air introduced through the inlet from flowing straight ahead in the housing.

4. The system according to claim 1, wherein the inside of the expansion chamber is divided into a plurality of sections.

5. The system according to claim 1, wherein,
    the housing includes a case and a lid, and the case and the lid are fastened together at flanges in the vertical direction.

6. The system according to claim 1, wherein the collected liquid storage portion includes a heater for evaporating water by heating collected liquid.

7. The system according to claim 1, further comprising a hose connected to a lower section of the housing for draining the collected liquid.

8. The system according to claim 7, wherein the hose is transparent, and is provided with a scale corresponding to the volume of the collected liquid storage portion.

9. The system according to claim 1, wherein during loading operation, the air dryer passes the compressed air through a desiccant to remove oil and water from the compressed air, and discharges the dried compressed air via the supplying line, during unloading operation, the air dryer passes the dried compressed air supplied via the supplying line through the desiccant to regenerate the desiccant, and discharges the purge air including the removed oil and water via the exhaust line, and the oil separator, during the unloading operation, causes the purge air introduced through the inlet to strike the impingement member to separate oil from the introduced purge air, thereby recovering the oil.

* * * * *